(12) United States Patent
Ellis et al.

(10) Patent No.: US 11,888,903 B2
(45) Date of Patent: Jan. 30, 2024

(54) METHODS AND APPARATUS TO FACILITATE END-USER DEFINED POLICY MANAGEMENT

(71) Applicant: Intel Corporation, Santa Clara, CA (US)

(72) Inventors: Keith A. Ellis, Carlow Town (IE); Ronan O'Malley, County Mayo (IE); Connor Upton, County Kildare (IE); David M. Boundy, County Cork (IE); Hugh Martin Carr, County Wicklow (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/851,671

(22) Filed: Jun. 28, 2022

(65) Prior Publication Data

US 2022/0329632 A1    Oct. 13, 2022

Related U.S. Application Data

(63) Continuation of application No. 17/025,830, filed on Sep. 18, 2020, now Pat. No. 11,553,004, which is a
(Continued)

(51) Int. Cl.
*H04L 9/40* (2022.01)
*H04W 12/08* (2021.01)
(Continued)

(52) U.S. Cl.
CPC .............. *H04L 63/20* (2013.01); *H04L 63/04* (2013.01); *H04L 63/102* (2013.01);
(Continued)

(58) Field of Classification Search
CPC ....... H04L 63/20; H04L 63/04; H04L 63/102; H04L 63/104; H04L 67/10; H04L 67/306; H04W 12/08
See application file for complete search history.

(56) References Cited

U.S. PATENT DOCUMENTS 8,613,070 B1    12/2013  Borzycki et al.
8,639,644 B1 *  1/2014   Hickman ............... G06N 3/008
                                                706/14
(Continued)

FOREIGN PATENT DOCUMENTS

CN    101621541 A    1/2010
CN    102365630 A    2/2012
(Continued)

OTHER PUBLICATIONS

European Patent Office: "Communication Pursuant to Rules 161(2) and 162 EPC," issued in corresponding European Patent Application No. 16849238.7-1217, dated May 4, 2018, 3 pages.
(Continued)

*Primary Examiner* — Techane Gergiso
(74) *Attorney, Agent, or Firm* — Hanley, Flight & Zimmerman, LLC

(57) ABSTRACT

Methods, apparatus, systems and articles of manufacture are disclosed to facilitate end-user defined policy management. An example apparatus includes an edge node interface to detect addition of a networked user device to a service gateway, and to extract publish information from the networked user device. The example apparatus also includes a device context manager to identify tag parameters based on the publish information from the networked user device, and a tag manager to prohibit unauthorized disclosure of the
(Continued)

networked user device by setting values of the tag parameters based on a user profile associated with a type of the networked user device.

22 Claims, 11 Drawing Sheets

Related U.S. Application Data continuation of application No. 15/581,827, filed on Apr. 28, 2017, now Pat. No. 10,785,262, which is a continuation of application No. 14/866,399, filed on Sep. 25, 2015, now Pat. No. 9,641,553.

(51) Int. Cl.
  *H04L 67/10* (2022.01)
  *H04L 67/306* (2022.01)
(52) U.S. Cl.
  CPC ............ *H04L 63/104* (2013.01); *H04L 67/10* (2013.01); *H04L 67/306* (2013.01); *H04W 12/08* (2013.01)

(56) References Cited

U.S. PATENT DOCUMENTS

| | | | |
|---|---|---|---|
| 8,875,230 B1 | 10/2014 | Weiner et al. | |
| 9,026,841 B1* | 5/2015 | Kim ...................... | H04W 12/12 714/4.3 |
| 9,135,208 B1 | 9/2015 | Huang et al. | |
| 9,471,533 B1 | 10/2016 | Roth et al. | |
| 9,629,193 B2* | 4/2017 | Erickson ................. | H04L 69/22 |
| 9,641,553 B2 | 5/2017 | Ellis et al. | |
| 10,785,262 B2 | 9/2020 | Ellis et al. | |
| 2002/0010798 A1 | 1/2002 | Ben-Shaul et al. | |
| 2006/0136717 A1 | 6/2006 | Buer et al. | |
| 2006/0137005 A1 | 6/2006 | Park | |
| 2006/0161879 A1 | 7/2006 | Lubrecht et al. | |
| 2008/0059474 A1 | 3/2008 | Lim | |
| 2009/0116429 A1 | 5/2009 | Kimura et al. | |
| 2010/0011027 A1 | 1/2010 | Cox et al. | |
| 2010/0235877 A1 | 9/2010 | Hu et al. | |
| 2011/0271007 A1 | 11/2011 | Wang et al. | |
| 2012/0022700 A1 | 1/2012 | Drees et al. | |
| 2012/0159176 A1 | 6/2012 | Ravindran et al. | |
| 2012/0177054 A1 | 7/2012 | Pati et al. | |
| 2013/0007443 A1* | 1/2013 | Grab ....................... | G06F 21/10 713/150 |
| 2013/0193203 A1 | 8/2013 | Larson et al. | |
| 2013/0205372 A1 | 8/2013 | Gilbert et al. | |
| 2013/0303085 A1 | 11/2013 | Boucher et al. | |
| 2013/0324121 A1 | 12/2013 | Kwon et al. | |
| 2014/0006225 A1* | 1/2014 | Bowman ............... | G06Q 10/087 705/28 |
| 2014/0032267 A1 | 1/2014 | Smith et al. | |
| 2014/0192717 A1 | 7/2014 | Liu et al. | |
| 2014/0244768 A1 | 8/2014 | Shuman et al. | |
| 2014/0372561 A1 | 12/2014 | Hisano | |
| 2015/0038080 A1 | 2/2015 | Stroud | |
| 2015/0074232 A1 | 3/2015 | Phillips et al. | |
| 2015/0135258 A1 | 5/2015 | Smith et al. | |
| 2015/0156031 A1 | 6/2015 | Fadell et al. | |
| 2015/0156266 A1 | 6/2015 | Gupta | |
| 2015/0230167 A1 | 8/2015 | Choi et al. | |
| 2015/0249663 A1 | 9/2015 | Svigals | |
| 2015/0347114 A1 | 12/2015 | Yoon | |
| 2016/0013948 A1* | 1/2016 | Moses ................. | H04L 63/0442 713/156 |
| 2016/0057020 A1* | 2/2016 | Halmstad ............... | H04L 41/22 715/740 |
| 2016/0080246 A1 | 3/2016 | Yong et al. | |
| 2016/0182480 A1 | 6/2016 | Entezari et al. | |
| 2016/0212208 A1 | 7/2016 | Kulkarni et al. | |
| 2016/0248782 A1 | 8/2016 | Troesch | |
| 2016/0321447 A1* | 11/2016 | Lancioni ............... | H04W 12/06 |
| 2016/0344745 A1 | 11/2016 | Johnson et al. | |
| 2017/0006528 A1 | 1/2017 | Bari | |
| 2017/0093915 A1 | 3/2017 | Ellis et al. | |
| 2018/0184287 A1 | 6/2018 | Khan et al. | |
| 2021/0250377 A1 | 8/2021 | Ellis et al. | |
| 2021/0302923 A1* | 9/2021 | Strohmenger ..... | G05B 19/0426 |

FOREIGN PATENT DOCUMENTS

| | | |
|---|---|---|
| CN | 102801773 A | 11/2012 |
| CN | 103676821 A | 3/2014 |
| CN | 103929324 A | 7/2014 |
| CN | 104898453 A | 9/2015 |
| CN | 105794176 A | 7/2016 |
| JP | 2002-056074 A | 2/2002 |
| WO | 2014131001 A1 | 8/2014 |
| WO | 2014/175721 A1 | 10/2014 |
| WO | 2015/081063 A1 | 6/2015 |

OTHER PUBLICATIONS

International Bureau: "International Preliminary Report on Patentability," issued in corresponding International Patent Application No. PCT/US2016/048124 dated Mar. 27, 2018, 8 pages.
International Searching Authority: "International Search Report and Written Opinion," issued in corresponding International Patent Application No. PCT/US2016/048124 dated Nov. 21, 2016, 12 pages.
United States Patent and Trademark Office: "Notice of Allowance and Fee(s) Due," issued in corresponding U.S. Appl. No. 14/866,399 dated Dec. 30, 2016, 16 pages.
Henze et al.: "User-driven Privacy Enforcement for Cloud-Based Services in the Internet of Things," 2014 IEEE Computer Society, Aug. 27, 2014, pp. 191-196, 6 pages.
European Patent Office: "Extended Search Report," issued in corresponding European Patent Application No. 16849238.7-1218 dated Feb. 11, 2019, 9 pages.
European Patent Office: "Communication under Rule 71(3) EPC," issued in corresponding European Patent Application No. 16849238.7-1218 dated Jun. 29, 2020, 7 pages.
United States Patent and Trademark Office: "Non-Final Rejection," issued in corresponding U.S. Appl. No. 15/581,827 dated Dec. 28, 2018, 8 pages.
United States Patent and Trademark Office: "Final Rejection," issued in corresponding U.S. Appl. No. 15/581,827 dated Jun. 7, 2019, 9 pages.
United States Patent and Trademark Office: "Non-Final Rejection," issued in corresponding U.S. Appl. No. 15/581,827 dated Oct. 31, 2019, 10 pages.
United States Patent and Trademark Office: "Notice of Allowance and Fee(s) Due," issued in corresponding U.S. Appl. No. 15/581,827 dated May 8, 2020, 16 pages.
The State Intellectual Property Office of People's Republic of China: "The First Office Action," issued in corresponding Chinese Patent Application No. 201680049399.X dated Jun. 16, 2021, 9 pages including partial English translation.
The State Intellectual Property Office of People's Republic of China: "Notice of Granting Patent Right For Invention," issued in corresponding Chinese Patent Application No. 201680049399.X dated Jan. 26, 2022, 2 pages including partial English translation.
United States Patent and Trademark Office: "Non-Final Rejection," issued in corresponding U.S. Appl. No. 17/025,830 dated Oct. 15, 2021, 18 pages.
The State Intellectual Property Office of People's Republic of China, "First Office Action and Search Report," issued in connection with Chinese Patent Appl. No. 202210367552.0, dated Jul. 27, 2023, 14 pages. [English machine translation included].
Qiong et al., "IoT identification, device activation and policy control analysis," Post and Telecommunications Consulting and Design

(56) References Cited

OTHER PUBLICATIONS

Institute Co., Ltd., Post and Telecommunications Design Technology, Issue 6, 2012, pp. 18-21, citing abstract with machine English translation, 3 pages.

The State Intellectual Property Office of People's Republic of China, "Notice of Granting Patent Right for Invention and Search Report," issued in connection with Chinese Patent Appl. No. 202210367552.0, dated Sep. 26, 2023, 6 pages. [English translation included].

* cited by examiner

| TAG PARAMETERS | DEVICE 1 | DEVICE 2 | DEVICE 3 | DEVICE 4 | DEVICE 5 | DEVICE 6 |
|---|---|---|---|---|---|---|
| TAG NAME | Front Door | Living Room | Living Room | Furnace | Lights Room A | Lights Room B |
| TAG DESC. | Open/Close Status | Living Room Motion | Living Room Temp | House Furnace Power | | |
| TAG OWNER | Jane/Sarah * | Jane/Sarah * | Jane/Sarah # | Jane # | Jane # | Sarah |
| TAG GROUP | Common * | Common * | Shared Energy # | Shared Energy # | Shared Energy # | Local Control |
| TAG PUBLISH POLICY | Local * | Local * | Global | Global | Global | Local |
| TAG NETW. AUTH. | HAN/Remote * | HAN/Remote * | HAN/Remote # | HAN/Remote # | HAN/Remote # | HAN Only |
| ASSN. TYPE | Context Security * | Context Security * | Context Energy | Context Energy | Manual | Manual |
| TAG DEVICE TYPE | Magnet Sensor | Motion Sensor | Thermo-couple | Watt Meter | Relay | Relay |
| TAG DEVICE LOCATION | Front Door | Living Room | Living Room | Furnace Room | Bedroom A | Bedroom B |
| TAG DEVICE OBJECTIVE | Home Security | Home Security | Energy Savings & Mgmt. | Energy Savings & Mgmt. | Device Control | Device Control |
| TAG INCENTIVE | Yes | No | Yes # | Yes # | Yes # | No |
| TAG SERVICE ACCESS | ADT Security | N/A | Utility A | Utility B | Any | N/A |

FIG. 2

METHODS AND APPARATUS TO FACILITATE END-USER DEFINED POLICY MANAGEMENT

RELATED APPLICATION

This patent arises from a continuation of U.S. patent application Ser. No. 17/025,830, filed on Sep. 18, 2020, which is a continuation of U.S. patent application Ser. No. 15/581,827, filed on Apr. 28, 2017, which is a continuation of U.S. patent application Ser. No. 14/866,399, filed on Sep. 25, 2015. U.S. patent application Ser. No. 17/025,830; U.S. patent application Ser. No. 15/581,827; and U.S. patent application Ser. No. 14/866,399 are hereby incorporated herein by reference in their entireties. Priority to U.S. patent application Ser. No. 17/025,830; U.S. patent application Ser. No. 15/581,827and U.S. patent application Ser. No. 14/866,399 is hereby claimed.

FIELD OF THE DISCLOSURE

This disclosure relates generally to control of user data, and, more particularly, to methods and apparatus to facilitate end-user defined policy management.

BACKGROUND

In recent years, network connected devices have facilitated services for household members, building managers and/or businesses, in which the connected devices share information. Such shared information may be sent to and/or otherwise received by utility companies, security companies and/or users to control and/or monitor the network connected devices. In some examples, the utility companies may retrieve and/or otherwise receive the shared information for the purpose of providing incentives, such as energy saving opportunities.

BRIEF DESCRIPTION OF THE DRAWINGS

FIG. 2 is an example tag table constructed in accordance with the teachings of this disclosure.

DETAILED DESCRIPTION

Figure 1:
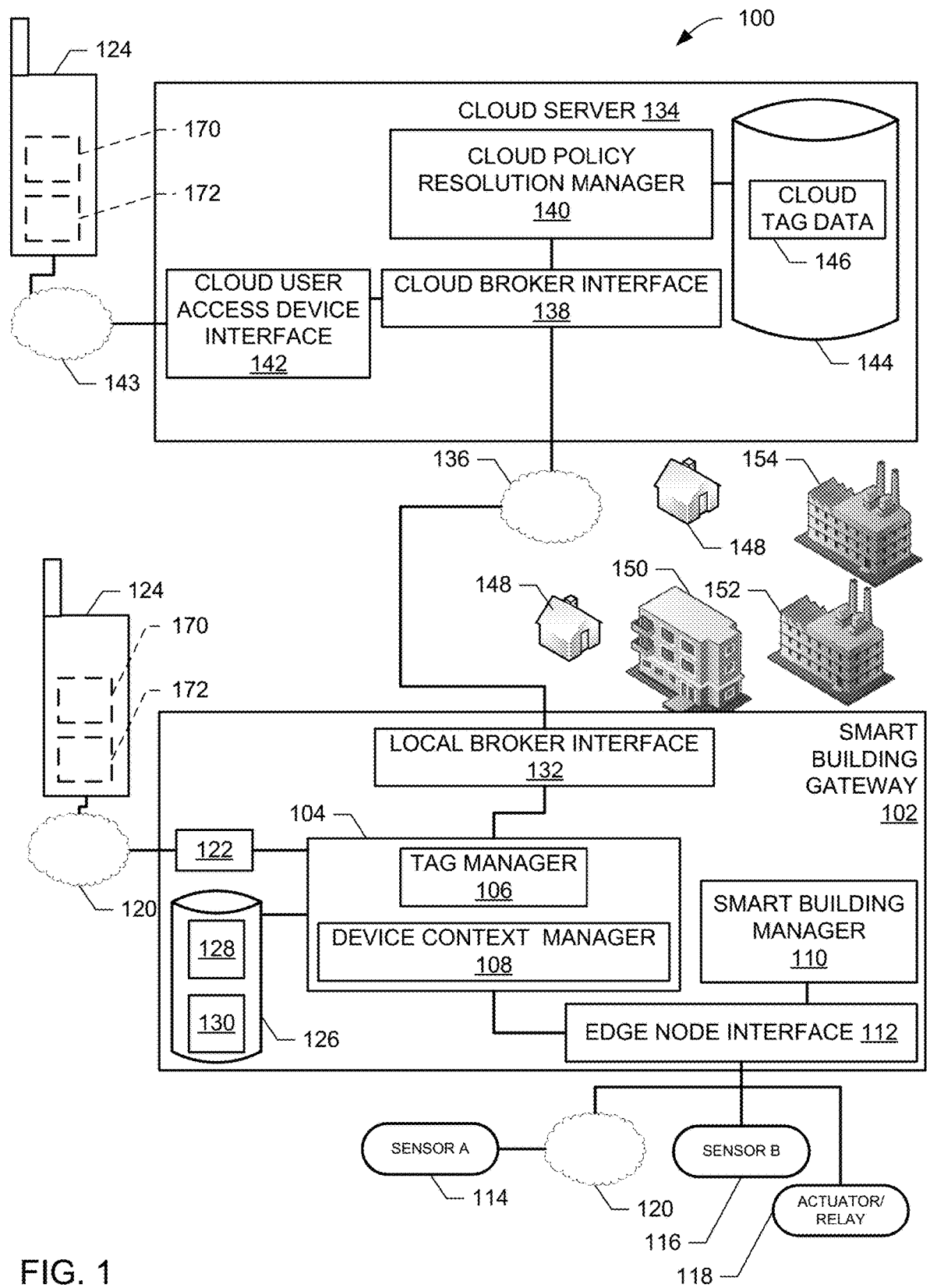
FIG. 1 is a schematic illustration of an example policy management system to facilitate policy management.

Energy efficiency and home security are two example markets in which Internet of Things (IoT) solutions and IoT devices have grown. As used herein, "IoT devices" or "networked user devices" solutions include (a) devices having sensors responsive to environmental conditions and/or actuators and (b) network connectivity to send/receive data from the sensors and/or actuators. As used herein, "IoT solutions" includes services that access, retrieve, receive and/or otherwise consume data from the networked user devices (IoT devices). In some examples, a networked user device includes a thermostat, in which a temperature sensor measures an ambient temperature of a room and one or more actuators in the form of electronic and/or electromechanical switches to engage/disengage heating and/or cooling devices, such as air conditioning units or furnace units. The example IoT thermostat may also include logic to transmit the temperature information to a network destination, such as a power utility company. In some examples, the power utility company can control the actuators based on energy savings opportunities, such as reduced energy rates during certain times of day. In still other examples, the IoT thermostat may include logic to identify user trends within the room and control the actuator(s) based on observed user behaviors without transmitting the temperature data on the network. However, without receiving and/or otherwise retrieving the temperature data, the power utility company may not be able to calculate and/or otherwise generate suggestions, incentives and/or promotions for the facility (e.g., household, building, business, factory, etc.) in which the IoT thermostat resides.

In some examples, the IoT device is provided by the power utility company to the facility (e.g., residential household) for a two-fold purpose of (a) providing the household with energy saving opportunities and (b) reducing an energy load of the power utility company infrastructure (e.g., electrical power distribution loads). While temperature data associated with the room in which the example IoT thermostat is located may be identified as private information according to particular laws/legislation, other information associated with an operational status of the IoT thermostat may not violate such laws. Operational status information of the example IoT thermostat may include processor operating status/health (e.g., processor utilization), memory status/health, power cycle logs of the device, operational error codes, etc. As such, in the event a household elects to completely disable the networking capabilities of the example IoT thermostat, then troubleshooting and/or service opportunities of the device cannot be fixed. In other words, because the example IoT thermostat cannot separate personal data from operational data, household user adoption of IoT devices aimed at providing both consumer benefits and utility benefits cannot be realized. Examples disclosed herein protect user privacy by separating user data from operational data. As such, a greater degree of trust for any IoT devices is fostered and IoT service adoption is improved.

While examples above describe an IoT thermostat device in a household, examples disclosed herein are not limited thereto. In some examples, the IoT solution includes two or more devices placed within a single facility (e.g., a residence), or within a building having two or more residences. For example, the utility company may provide an apartment building manager with an IoT solution having a thermostat for each apartment and additional temperature sensors within each bedroom of each apartment. In some examples, each bedroom may have an IoT space heater, an IoT shade controller (e.g., to open/close window shades/blinds based on ambient light conditions and/or temperature), and/or an IoT light switch controller. As such, in the event the apartment building manager accepts the IoT solution from the utility company for the purpose of reducing energy costs associated with the apartment building, then one or more apartment residents' personal information may be disclosed in a manner that violates local laws/legislation. Similarly, in circumstances having a single dwelling with multiple occupants (e.g., apartment roommates), even if one roommate of a single example apartment agrees to use and/or otherwise install IoT devices within the apartment, a second roommate may not agree to having one or more aspects of their personal information disclosed to the utility company. Examples disclosed herein reduce and/or eliminate such user data conflicts.

In still other examples, for households that adopt one or more IoT solutions (e.g., IoT light switches, IoT door sensors, IoT security systems, etc.), query and/or actuation activities are typically routed through a cloud-based communication infrastructure. For example, in the event a household user attempts to open or close window shades with an IoT shade controller using a wireless device (e.g., a wireless telephone), then an actuation command is sent from the wireless device to either a home area network (HAN) or from a data service associated with the wireless device (e.g., via a cell-based data connection). The actuation command is further routed to a cloud-based IoT management server that analyzes the command and returns an actuation control signal to the IoT shade controller via another network, such as the Internet. When the IoT shade controller receives the actuation control signal, the desired effect occurs, such as opening or closing the shades. However, an associated propagation delay may result due to the communication infrastructure through which the command was routed. Examples disclosed herein reduce actuation and/or query latency by detecting whether such actuation and/or query requests originate from the HAN or originate remotely from the HAN, and circumvent one or more networks external to the HAN to decrease latency, as described in further detail below.

FIG. 1 is a schematic illustration of an example policy management system 100 to facilitate policy management of IoT devices. In the illustrated example of FIG. 1, the system 100 includes a smart building gateway 102 (sometimes referred to herein as a "service gateway"), a local policy resolution manager 104, a tag manager 106, a device context manager 108, and a smart building manager 110. The example system 100 also includes an edge node interface 112 communicatively connected to an example first sensor (Sensor A) 114, an example second sensor (Sensor B) 116, and an example actuator 118. In some examples, a home area network (HAN) 120 (sometimes referred to herein as a local area network (LAN)) facilitates communication between sensor(s) and/or actuator(s), while in other examples communication is facilitated by WiFi, Zigbee, a wired connection, etc. The example system 100 also includes a local user access device interface 122 communicatively connected to a user access device 124 via the HAN 120. The example user access device 124 includes a network identifier 170 to distinguish whether it is connected to the HAN 120 or any other network (e.g., a cell network, a WiFi network (e.g., coffee shop WiFi), a Wide Area Network (WAN), etc.). In some examples, the network identifier 170 is integrated with and/or otherwise operates and/or otherwise executes as a wireless telephone application (e.g., an "App" downloaded and/or otherwise provided by iTunes®, Android®, etc). The example user access device 124 also includes a WiFi radio 172 that may facilitate communication with the system 100 instead of one or more cell-based radios of the example user access device 124, as described in further detail below. In some examples, the user access device 124 operates as a wireless telephone, a tablet, a personal computer and/or a wearable device. The example system 100 also includes a local storage 126 that contains, in part, a metadata database 128, which may store household tag information (e.g., spatial context information related to sensor(s), manufacture information related to sensor(s), tag values, etc.), and an end node database 130, which may store sensor data (e.g., sensor information, actuator acknowledgement/state information, etc.). The example system 100 also includes a local broker interface 132 communicatively connected to a cloud server 134 (sometimes referred to herein as a remote cloud server) via a network 136, such as the Internet.

In the illustrated example of FIG. 1, the system 100 includes a cloud broker interface 138, a cloud policy resolution manager 140, a cloud user access device interface 142, and a cloud storage 144 containing, in part, cloud tag data storage 146. When the example user access device 124 is not within a communication capability of the example HAN 120, the example cloud user access device interface 142 is communicatively connected to the example user access device 124 via a remote network 143, such as a wide area network (WAN) or a cell network associated with the user access device 124.

In the illustrated example of FIG. 1, the smart building gateway 102 (service gateway) may be located within a household, a business, an apartment complex, a factory, etc. While examples disclosed herein refer to the example service gateway 102 as part of a household, examples disclosed herein consider any number of additional or alternative households having separate smart building gateways within other households 148, and/or apartment building(s) 150. The example service gateway 102 provides one or more services for a facility (e.g., dwelling, factory) based on network connected user devices (IoT devices). An example first utility company (Utility A) 152 and an example second utility company (Utility B) 154 are communicatively connected to the example system 100 via the network 136 to provide one or more services to locations having an example smart building gateway 102 and/or the example cloud server 134.

In operation, the example local policy resolution manager 104 determines whether a policy update trigger has occurred and, if so, the example smart building gateway 102 manages the policy trigger. For example, in the event a user desires to change the manner in which personal information from one or more sensors or actuators is handled, then the example smart building gateway 102 provides a user interface to allow one or more tags associated with the one or more sensors/actuators to be configured, as described in further detail below. As used herein, "tags" or "tag parameters" refer to metadata associated with each IoT device of interest. As described in further detail below, tag parameters define a manner of accessibility and/or control of IoT devices and IoT device data. In the event that the example local policy resolution manager 104 detects that one or more new devices (e.g., sensors and/or actuators) are installed, then the example smart building gateway 102 reduces configuration time by assigning policy parameters (tag parameters) to each new device based on device-type information and context, as described in further detail below. As such, examples disclosed herein allow a system providing IoT services to adapt to changing conditions such as, but not limited to, IoT devices added/removed, changing user preferences regarding IoT data disclosure, changing/new IoT services offered by third parties (e.g., utilities) and/or changing laws/legislation regarding privacy and data disclosure restrictions. Further, the use of tag parameters prevents unauthorized disclosure of IoT data, protects user privacy, and reduces or eliminates data privacy conflicts for single dwelling/multiple occupant households.

If one or more policy update triggers does not occur, the example cloud server 134 or the example local policy resolution manager 104 identifies whether one or more runtime triggers occur. For example, in the event a device satisfies one or more operating thresholds (e.g., a temperature threshold, a door sensor change, a motion detector trigger, etc.), or if a device is queried (e.g., a local query for a sensor, a remote query for a sensor, a local switch activation, a remote switch activation, a etc.), then the example system 100 determines whether publication of the device is to be shared (e.g., shared with a utility company) or whether the device may be queried or controlled by the user access device 124. Such decisions are based on tag parameters associated with the device that has satisfied an operating threshold, is queried, or is requested to be controlled.

As described above, each device is associated with tag parameters to define how the device is to operate and access privileges afforded to different entities requesting information or control attempts of the device. The example tag manager 106 generates and manages a household tag table 200, as shown in FIG. 2. In the illustrated example of FIG. 2, the tag table 200 includes a tag parameters column 202. The example tag parameters column includes a tag name 204, a tag description 206, a tag owner 208, a tag group 210, a tag publish policy 212, a tag network authorization type 214, a tag assignment type 216, a tag device type 218, a tag device location 220, a tag device objective 222, a tag incentive notification 224, and a tag service access permission 226. The example household tag table 200 also includes a column for each device associated with the household. In the illustrated example of FIG. 2, the household tag table 200 includes six (6) example devices named "Device 1" through "Device 6," but any number of additional or alternative devices may be considered.

In the illustrated example of FIG. 2, the tag name 204 reflects a name associated with each device, such as "Front Door" for Device 1, and the tag description 206 reflects descriptive information related to the device, such as "Front door open status" for Device 1. Because a particular household may have any number of household members therein, the example tag owner 208 reflects which household member may exercise control over the tag parameters associated with any particular device. For example, the tag owner 208 associated with Device 1 refers to "Jane/Sarah" to indicate that either of those household members may make changes to Device 1 (e.g., a shared device). For example, both Jane and Sarah may have corresponding usernames and passwords when accessing the example local policy resolution manager 104 of the policy management system 100. In the event household member Jane logs into the local policy resolution manager (e.g., via a network (e.g., Internet) personal computing device 124), then only Devices 1-5 would be viewable and/or otherwise available for modification because the tag owner 208 parameter associated with Device 6 is assigned to Sarah only. As described above, because examples disclosed herein allow each device to have unique parameter tags to define device behavior, IoT solutions may be implemented without concern that certain types of personal information will be disclosed without permission and/or that certain types of personal information will be outside user control.

The example tag group 210 parameter reflects user defined groups that may be created by one or more users for one or more household devices. By way of example, and not limitation, a particular tag group links two or more tag parameters to have similar values. In the illustrated example of FIG. 2, a "Common" tag group 210 links the tag owner 208 parameter, the tag publish policy 212 parameter, the tag network authorization 214 parameter and the assignment type 216 parameter. For the sake of illustration, and not limitation, the "Common" group linked tag parameters are illustrated with an "*". As such, any device associated with the example "Common" tag group 210 will include the same values for corresponding tag parameters. On the other hand, the example "Shared Energy" tag group 210 links the tag owner 208 parameters, the tag network authorization 214 parameter, and the tag incentive notification 224 parameter. For the sake of illustration, and not limitation, the "Shared Energy" group linked tag parameters are associated with a "#". As such, any device associated with the example "Shared Energy" tag group 210 will include the same values for corresponding tag parameters. In still other examples, user defined groups referenced by the example tag group 210 associate other IoT devices having a shared characteristic, such as a spatial location. For instance, a building manager having or installing an IoT wattage meter in apartment laundry closets may be faced with hundreds of IoT devices to manage and/or classify. However, assigning such wattage meters as associated with a particular user group reduces an amount of time needed to obtain query information for similarly situated IoT devices. Additionally, in the event additional wattage meter IoT devices are installed in additional laundry closets, by associating it with the same tag, other tag parameters may be automatically assigned to the newly installed IoT device in a less tedious and/or time consuming manner.

The example tag publish policy 212 parameter reflects whether data (e.g., data deemed personal by the owner of the IoT device) associated with the device is allowed to be published to one or more third parties. In the illustrated example of FIG. 2, any tag publish policy 212 parameter with a value of "Local" will not, by default, allow any third party to receive and/or otherwise retrieve data associated with the corresponding device. On the other hand, any example tag publish policy 212 parameter with a value of "Global" will allow at least one third party to receive and/or otherwise retrieve data associated with the corresponding device. In the event a user associates an IoT wattage meter device with the tag publish policy "Global," then an example power utility company can monitor the power consumption of that device for a period of time (e.g., one month). Based on the data collected by the example IoT wattage meter that was transmitted and/or otherwise retrieved by the power utility company, one or more incentive metrics may be generated by the power utility company to help the user save additional money and/or consume less power. For example, if the IoT wattage meter is connected to a washing machine, then the power utility company may identify that the washing machine was operating 40% of the time during peak power times of the day. As such, the power utility company may transmit one or more incentives to the user associated with the IoT wattage meter to modify the time of day in which the washing machine is used, thereby revealing money saving opportunities for the user and power distribution benefits for the power utility company.

On the other hand, in the event the user associates the example IoT wattage meter device with the tag publish policy "Local," then the power utility company is not permitted to retrieve and/or otherwise receive the information necessary to identify how much money the user is capable of saving in the future based on time of day usage behaviors. However, the power utility company may still send the user an incentive based on, for example, the average amount of money saved by neighbors in the past month in view of time of day usage modifications.

The example tag network authorization 214 parameter reflects a device control and/or query permission of the associated device. To illustrate, an example "HAN Only" tag network authorization 214 parameter associated with Device 6 results in control by a user access device (e.g., a wireless telephone) only when that user access device is connected to the HAN. Thus, in the event the user access device is located external to the HAN (e.g., coffee-shop WiFi), then query and/or control of IoT Device 6 will not be permitted. On the other hand, in the event the tag network authorization 214 parameter is set to "HAN/Remote," then the user access device associated with the IoT device may be queried and/or controlled regardless of the user device network connectivity location.

The example tag assignment type 216 parameter reflects context information associated with an IoT device. In the illustrated example of FIG. 2, Device 1 is associated with "Context-Security" to reflect that Device 1 participates in security-related functionality. In some examples, an installed IoT device contains identification information related to a model number, a serial number, control capabilities, input values and/or output values (e.g., current output values in amps, voltage output values in millivolts, binary motion logic (e.g., TRUE for motion activity, FALSE for no motion activity), etc.). In some examples, the tag manager 106 populates the tag assignment type 216 parameter in response to detecting that a new IoT device is added to the system 100, thereby reducing an amount of time required to configure the IoT device. Additionally, the example tag manager 106 may populate the tag device type 218 parameter based on available device information stored on and/or otherwise available when a new IoT device is added to the system 100. In the illustrated example of FIG. 2, the tag device type 218 parameter for Device 1 is "Magnet Sensor" to reflect a device type. In some examples, the edge node interface 112 detects insertion or addition of an IoT device and extracts available model number and/or serial number information associated with the IoT device, and invokes a network (e.g., Internet) query to the network 136 via the example local broker interface 132 (e.g., via a keyword web search using the model/serial number). In the event additional information from the network 136 is received based on provided model and/or serial number information, the example tag manager 106 populates values for corresponding tag parameter(s) 202, such as the example tag device type 218 parameter and/or the example tag assignment type 216 parameter.

The example tag device location 220 parameter reflects a location within the household (or factory, or apartment complex) in which an IoT device operates, such as a front door (e.g., magnet sensor to detect when the door is open/closed), a living room (e.g., a motion sensor to detect motion within the living room), a furnace room and/or a bedroom within a household. Additionally, the example tag device objective 222 parameter reflects a designated purpose for an IoT device within the household, such as objectives related to home security, energy savings, energy management, device control (e.g., window shade control, light control, etc.), etc.

In some examples, users that install one or more IoT devices do not desire solicitation and/or messages related to potential incentives from third parties. As described above, example third party power utility companies may collect IoT device output over a period of time to identify one or more energy and/or money saving incentive suggestions for the user. In the event a particular IoT device is configured as "Global" via the tag publish policy 212 parameter, any incentive suggestions/notifications may be halted if the example tag incentive notification 224 parameter is set to "No."

In some examples, when an IoT device tag publish policy 212 parameter is set to "Global," then any third party (e.g., a power utility company, a gas utility company, a security company, etc.) may have access to the output data from the example IoT device. On the other hand, the example tag service access permission 226 parameter may delineate which particular third parties may have access to the output data generated by the example IoT device. In the illustrated example of FIG. 2, "ADT Security" is identified as the only third party having authorization to retrieve and/or otherwise receive output data associated with Device 1, while "Energy Utility B" is identified as the only third party having authorization to retrieve and/or otherwise receive output data associated with Device 4.

Returning to the illustrated example of FIG. 1, in the event a new IoT device is detected by the edge node interface 112, any available data (e.g., sensor publish data, such as a device type, a device model number, a device assignment type, etc.) associated with that IoT device is retrieved and the example device context manager 108 determines if this information matches context associated with a user group, such as the example "Common" group described above in connection with FIG. 2. If so, then the example tag manager 106 associates the new IoT device with tag parameters related to that group. In some examples, if the group parameters include a tag publish policy "Global," then the example policy resolution manager 104 transmits the group parameters via the example local broker interface 132 to the example cloud server 134 so that the example cloud storage 144 can update the cloud tag data storage 146 associated with the newly added IoT device(s). However, in the event that the newly added IoT device does not include data that matches an existing group (e.g., a defined user group), then the example device context manager 108 determines if the newly added IoT device is of a same type as a previously installed IoT device. If so, then the example tag manager 106 associates tag parameter 202 values for the new IoT device with similar values from the matching previously installed IoT device. In other words, examples disclosed herein can learn from prior behaviors of the facility in which IoT devices are used and/or installed. On the other hand, if the example device context manager 108 cannot determine device type data associated with the newly added IoT device, then the example tag manager 106 prompts a user to manually add unknown tag parameter 202 values for the IoT device. In some examples, the local user access device interface 122 or the cloud user access device interface 142 (depending on the location of the user access device 124) includes a web server and/or other text-based or graphical user interface for the user to facilitate tag parameter 202 value entry of the example household tag table 200. In still further examples, updates to the example household tag table 200 may be accomplished via a web-based device (e.g., a personal computer) or the user access device 124.

In some examples, IoT devices include on-board logic for services, such as user defined set-points and/or control instructions. In still other examples, the smart building manager 110 retrieves and/or otherwise receives IoT device output data and, based on services, set-points and/or control scripts analyzed by the smart building manager, controls the IoT device(s) to accomplish one or more services (e.g., heating/cooling control). Other examples include a third party may publish a new and/or updated/modified service that is associated with one or more IoT devices operating within the example system 100. Example new services and/or updated/modified services may include, but are not limited to promotional incentives and/or operational changes in the manner in which data is handled (e.g., legislative changes, privacy disclosures). When the example local policy resolution manager 104 detects that a third party transmits a notification related to a service opportunity and/or change that is targeted and/or otherwise associated with an IoT device for a user, the example tag manager 106 queries the example tag incentive notification 224 parameter. If the example tag incentive notification 224 parameter reflects a permissive value (e.g., "Yes," "True," "1," etc.), then the notification sent by the third party is allowed to be forwarded to the user access device 124 for consideration. If the user agrees to the incentive, then the example tag manager 106 updates corresponding tag parameters 202 to reflect a desire to participate. For example, upon agreeing to the incentive, the example tag manager 106 adds the third party name to the example tag service access permission 226 parameter associated with the particular device (e.g., Device 1) that will participate with the third party service. Additionally, if the third party service includes one or more objectives to control IoT devices, then the example local policy resolution manager 104 may permit instructions, scripts and/or control logic to be uploaded to and/or otherwise stored, which is accessible by the example smart building manager 110.

In some examples, the local user access device interface 122 receives a request from the user access device 124 (or a computing device providing valid logon credentials) to update and/or modify one or more tag parameters 202 associated with one or more IoT devices. In response to such a request, the example tag manager enables a user interface (e.g., a web-based GUI provided by the local user access device interface 122) to facilitate user input/interaction with the example household tag table 200, and the example local policy resolution manager 104 enables viewing and/or modification rights for only those IoT device(s) for which an authorized user is associated. Changes to one or more tag parameters 202 are stored in the example metadata database 128 of the local storage 126, and the example local policy resolution manager 104 determines whether such changes require propagation of modified tag parameters 202 to the example cloud server 134.

As described above, some IoT devices may be configured with the example tag publish policy 212 parameter as "Local," while other IoT devices may be configured as "Global." In the event any IoT device is configured as "Local," then publishing of data generated by that IoT device is, by default, prohibited from leaving the HAN. As such, queries of that IoT device by the user access device 124 when that user is also connected to the HAN will be permitted. However, queries of that IoT device by the user (or anyone else) via the user access device 124 when that user is connected to any other network are prohibited. Thus, for IoT devices configured as "Local," corresponding tag parameters 202 for that IoT device are absent and/or otherwise removed from the cloud storage 144 of the example cloud server 134. However, while the example tag publish policy 212 parameter of "Local" will, by default, prohibit all disclosure of the IoT device data to both third parties and any user access device 124 external to the HAN, the example tag network authorization 214 parameter allows the user access device 124 to query or control the IoT device while also prohibiting data disclosure to any third party. In such circumstances, user access device 124 may be identified via, for example a media access control (MAC) address to verify authorization.

In the event the IoT device is configured as "Local" and the tag network authorization 214 parameter is configured as "HAN/Remote," then an authorized user access device 124 may still query and/or control the IoT device when that user access device 124 is not within the HAN. In that circumstance, the example local broker interface 132 updates the example cloud storage 144 in the cloud server 134 with the tag parameters 202 associated with the IoT device so that any query and/or control attempt by an authorized user access device 124 will be recognized by the cloud server 134 and acted upon. On the other hand, in the event any IoT device is configured as "Global," then publishing of data from that IoT device is, by default, allowed and/or otherwise accessible to both third parties (e.g., power utility companies) and authorized user access devices outside the HAN 120. Even in such circumstances where the IoT device is configured as "Global," analysis of the example tag service access permission 226 may establish one or more limits regarding which particular third parties may enjoy this permission.

While examples above describe configuration and management of the example system 100, additional examples described below relate to behavior of the system 100 during runtime. Example triggers occurring during runtime may be caused by a user access device 124 making a control request of an IoT device (e.g., a request to turn on/off lights in a room), or may be caused by the user access device 124 making a data query of the IoT device (e.g., requesting a temperature reading in a room). Additionally, example triggers occurring during runtime may be caused by IoT device operation, such as detecting an open door condition, satisfying a threshold room temperature and/or controlling one or more switches in response to satisfying the threshold room temperature to turn on/off heating and/or cooling equipment. As such, runtime triggers may be detected by the example edge node interface 112 when one or more IoT devices operates and/or otherwise responds to stimuli (e.g., temperature set points, light levels, door switch positions). Additionally, runtime triggers may be detected by the example local user access device interface 122 in response to the user access device 124 invoking a query and/or control attempt of one or more IoT devices while in the vicinity of the HAN 120. Still further, runtime triggers may be detected by the example cloud user access device interface 142 in response to the user access device 124 invoking a query and/or control attempt of one or more IoT devices while outside the vicinity of the HAN 120, such as when the example user access device 124 is communicatively connected to the remote network 143, a wide area network or a local area network (e.g., a coffee shop WiFi hotspot, a cell-based network associated with the user access device 124, etc.). In some examples, the network identifier 170 of the user access device 124 identifies a WiFi network, however because the WiFi network is not associated with the HAN 120 (e.g., the remote network 143), communication attempts by the example user access device 124 are facilitated via the example cloud server 134. On the other hand, in the event the example network identifier 170 determines a WiFi network that is also associated with the HAN 120, then communication attempts by the example user access device 124 are facilitated via the example smart building gateway 102.

When the example edge node interface 112 detects an output signal from one or more IoT devices, such as the example Sensor A 114, the example Sensor B 116 and/or the example actuator 118, device identification information is retrieved by the example local policy resolution manager 104. Additionally, the example edge node interface 112 retrieves any data from the one or more IoT devices, which is published to the example smart building manager 110 (e.g., via an event) so that corresponding services may be performed. For example, the smart building manager 110 of the smart building gateway 102 includes logic associated with services (e.g., user set-points, third-party control scripts, etc.) that occur based on IoT device output values received by the example edge node interface 112, which may include temperature output values evaluated by the smart building manager 110 to adjust one or more heating/cooling devices. In still other examples, the smart building manager 110 responds to light level output values of one or more IoT devices so that corresponding control signals may be sent to other IoT devices attached to window shades, thereby allowing open or close actions when light levels satisfy threshold values.

The example tag manager 106 evaluates the retrieved device identification information associated with the IoT device to determine whether the tag publish policy 212 parameter is either "Local" or "Global." If the IoT device is "Local," then the example local policy resolution manager 104 prevents and/or otherwise blocks publication to any third party (e.g., power utility company). However, and as described above, if the IoT device is classified as "Local" and if the example tag network authorization 214 parameter permits data access by an authorized user access device 124, then the example local policy resolution manager 104 permits such data to be transmitted to the example cloud server 134. On the other hand, in the event that the IoT device is "Global," then the example local policy resolution manager 104 permits, by default, one or more third parties to receive and/or otherwise access the IoT device output data.

Communication latency between the user access device 124 and the smart building gateway 102 is reduced because one or more external networks (e.g., a cell-based data radio/network of the user access device 124) are prevented from communication activities in favor of the WiFi radio 172. As the network identifier 170 detects connectivity with the HAN 120, communication is forced to occur with the HAN 120 via the WiFi radio 172, thereby reducing communication latency and preserving data consumption limits enforced by a service provider of the user access device 124. Because the user access device 124 is connected to the HAN 120, as determined by the example network identifier 170, the examples disclosed herein obtain the data locally from the example smart building manager 110 and/or end node database 130 of the local storage 126 rather than traditional IoT systems that route the query through the cloud server 134.

As described above, the network identifier 170 of the example user access device 124 may determine whether it is currently connected to the HAN 120 so that query and/or command instructions may be conducted with less propagation delay and/or expense. Traditional IoT systems route all communications through a cloud server (e.g., the cloud server 134) located on a network remotely located from a household. IoT service logic located in the cloud server receive data from one or more IoT devices, process the received data in a manner consistent with service objectives (e.g., turn on furnace when temperature falls below a temperature threshold value and the electricity rate is below a cost threshold value), and initiate one or more control signals to IoT devices to enact and/or otherwise accomplish the service objective(s) (e.g., turn on/off furnace). Similarly, traditional IoT systems route all query requests through that cloud server regardless of the query device location. For instance, if the query device is the user access device 124 (e.g., user cell phone) located within the household, then the query from the user access device 124 may employ a cell-based network communication system to send the query request to the cloud server, and the resulting data from the query is returned to the user access device 124 via that same cell-based network communication system. As a result, a quantity of data associated with the user access device 124 is consumed, which may be limited by the user's cell plan. Further, because the communication route is targeted to the remotely located cloud server, a corresponding propagation delay occurs. However, examples disclosed herein identify whether the user access device 124 is currently connected to the HAN 120 and, if so, the example network identifier 170 (e.g., a wireless device application) blocks and/or restricts one or more query and/or control attempts by any communication systems of the example user access device 124 except the WiFi radio 172 connected to the HAN 120. On the other hand, in the event a WiFi network is detected, but it is not associated with the HAN 120, then communication by the user access device 124 is to occur via the cloud server (e.g., via a foreign WiFi network, via a cell-based network, etc.).

In the event a query or control command is sent from the user access device 124 when participating and/or otherwise connected to a network other than the HAN 120, then the example cloud user access device interface 142 of the cloud server 134 generates a runtime trigger. The query or control command information, which includes a target IoT device name and/or identifier (e.g., Device 1, Device 2, etc.), is used by the example cloud policy resolution manager 140 in a query to the example cloud tag data storage 146 of the cloud storage 144. In the event parameters associated with the IoT device name and/or identifier are unavailable, then the query and/or control command is not authorized, and the cloud user access device interface 142 notifies the requesting user access device 124 that access to the requested IoT device is unavailable. As described above, information associated with devices that are not authorized to be accessed outside the HAN 120 and/or by one or more third parties may be withheld from storage in the example cloud storage 144, thereby prohibiting disclosure of personal information.

However, even if the example cloud tag data storage 146 of the cloud storage 144 is available in the cloud server 134, the example tag publish policy 212 parameter will contribute to a determination of whether the user access device 124 is authorized to query and/or otherwise control the IoT device. If the tag network authorization 214 parameter indicates authorization (e.g., "HAN/Remote"), then the example cloud resolution manager 140 permits publication (e.g., disclosure of the IoT device output data) and/or control (e.g., control of an actuator associated with the IoT device, such as lighting on/off, heater on/off, etc.). On the other hand, if the tag network authorization 214 parameter indicates a remote access restriction (e.g., "HAN Only"), then the example cloud resolution manager 140 prevents and/or otherwise blocks publication to any user access device 124 not connected to the HAN 120.

While an example manner of implementing the system 100 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example smart building gateway 102, the example local policy resolution manager 104, the example tag manager 106, the example device context manager 108, the example smart building manager 110, the example edge node interface 112, the example local user access device interface 122, the example user access device 124, the example network identifier 170, the example WiFi radio 172, the example local storage 126, the example metadata database 128, the example end node database 130, the example local broker interface 132, the example cloud server 134, the example cloud broker interface 138, the example cloud policy resolution manager 140, the example cloud user access device interface 142, the example cloud storage 144, the example cloud tag data storage 146 and/or, more generally, the example system 100 of FIGS. 1 and 2 may be implemented by hardware, software, firmware and/or any combination of hardware, software and/or firmware. Thus, for example, any of the example smart building gateway 102, the example local policy resolution manager 104, the example tag manager 106, the example device context manager 108, the example smart building manager 110, the example edge node interface 112, the example local user access device interface 122, the example user access device 124, the example network identifier 170, the example WiFi radio 172, the example local storage 126, the example metadata database 128, the example end node database 130, the example local broker interface 132, the example cloud server 134, the example cloud broker interface 138, the example cloud policy resolution manager 140, the example cloud user access device interface 142, the example cloud storage 144, the example cloud tag data storage 146 and/or, more generally, the example system 100 of FIGS. 1 and 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example smart building gateway 102, the example local policy resolution manager 104, the example tag manager 106, the example device context manager 108, the example smart building manager 110, the example edge node interface 112, the example local user access device interface 122, the example user access device 124, the example network identifier 170, the example WiFi radio 172, the example local storage 126, the example metadata database 128, the example end node database 130, the example local broker interface 132, the example cloud server 134, the example cloud broker interface 138, the example cloud policy resolution manager 140, the example cloud user access device interface 142, the example cloud storage 144, the example cloud tag data storage 146 and/or, more generally, the example system 100 of FIGS. 1 and 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example system of FIG. 1 may include one or more elements, processes and/or devices in addition to, or instead of, those illustrated in FIGS. 1 and 2, and/or may include more than one of any or all of the illustrated elements, processes and devices.

Flowcharts representative of example machine readable instructions for implementing the system 100 of FIGS. 1 and 2 are shown in FIGS. 3-7, 8A, 8B and 8C. In these examples, the machine readable instructions comprise a program for execution by a processor such as the processor 912 shown in the example processor platform 900 discussed below in connection with FIG. 9. While FIG. 9 illustrates one example processor platform 900, examples disclosed herein may include any number of additional and/or alternate processor platforms to implement one or more portions of the system 100 of FIGS. 1 and/or 2. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by one or more devices other than the processor 912 and/or embodied in firmware or dedicated hardware. For example, one or more portions of the system 100 of FIGS. 1 and 2 may operate in connection with large scale server based systems, in which such one or more portions may be referred to as "cloud-based" entities, cloud servers, etc. Additionally, one or more separate processor platform(s) 900 may be implemented for one or more different aspects of the example system 100 of FIGS. 1 and/or 2. In some examples, one or more processor platform(s) 900 may be dedicated to the example smart building gateway 102, one or more processor platform(s) 900 may be dedicated to the example cloud server 134, and one or more processor platform(s) 900 may be dedicated to the example user access device 124, as shown in the illustrated example of FIG. 9. Further, although the example programs are described with reference to the flowcharts illustrated in FIGS. 3-7, 8A, 8B and 8C, many other methods of implementing the example system 100 may alternatively be used. For example, the order of execution of the blocks may be changed, and/or some of the blocks described may be changed, eliminated, or combined.

As mentioned above, the example processes of FIGS. 3-7, 8A, 8B and 8C may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-7, 8A, 8B and 8C may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 3:
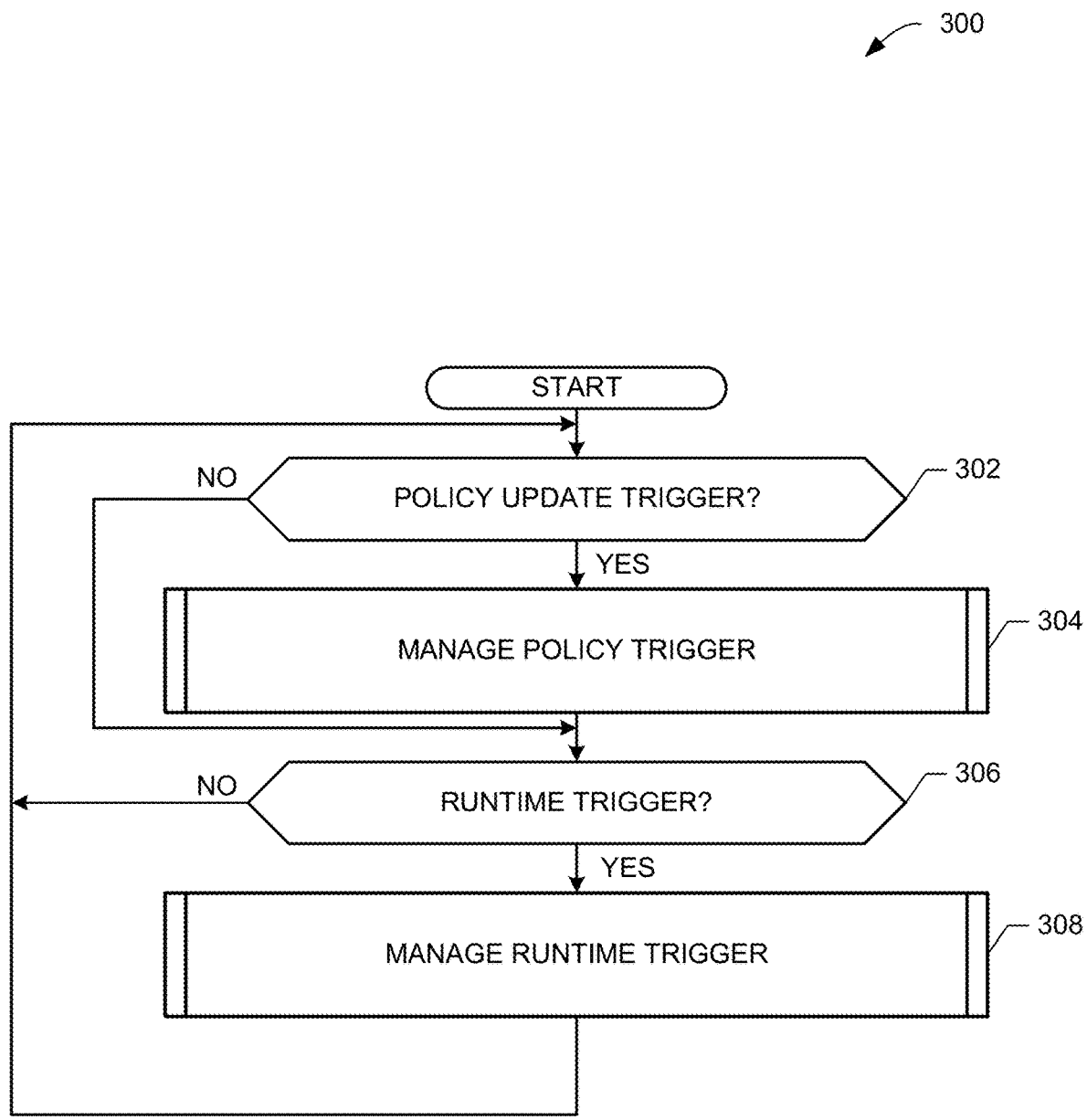
FIGS. 3-7, 8A, 8B and 8C are flowcharts representative of example machine readable instructions that may be executed to implement the example policy management system of FIG. 1 and the example tag table of FIG. 2.

The program 300 of FIG. 3 begins at block 302 where the example local policy resolution manager 104 determines whether a policy update trigger has occurred. As described above, the policy update trigger may be caused by an IoT device (e.g., IoT sensor, IoT actuator, etc.) being added to the system 100 (e.g., detected by the example edge node interface 112), a new and/or modified service published by a third party (e.g., a power utility company) (e.g., detected by the example local policy resolution manager 104 and published to the example smart building manager 110), and/or tag parameter modification (e.g., detected by the example local policy resolution manager 104). In response to detecting a policy update trigger, the example smart building gateway 102 manages the trigger (block 304). However, if no policy update trigger is detected (block 302), then the example cloud server 134 and/or the example smart building gateway 102 determines if a runtime trigger has occurred (block 306). If so, then one or more of the example cloud server 134 or the example smart building gateway 102 manages the detected runtime trigger (block 308).

Figure 4:
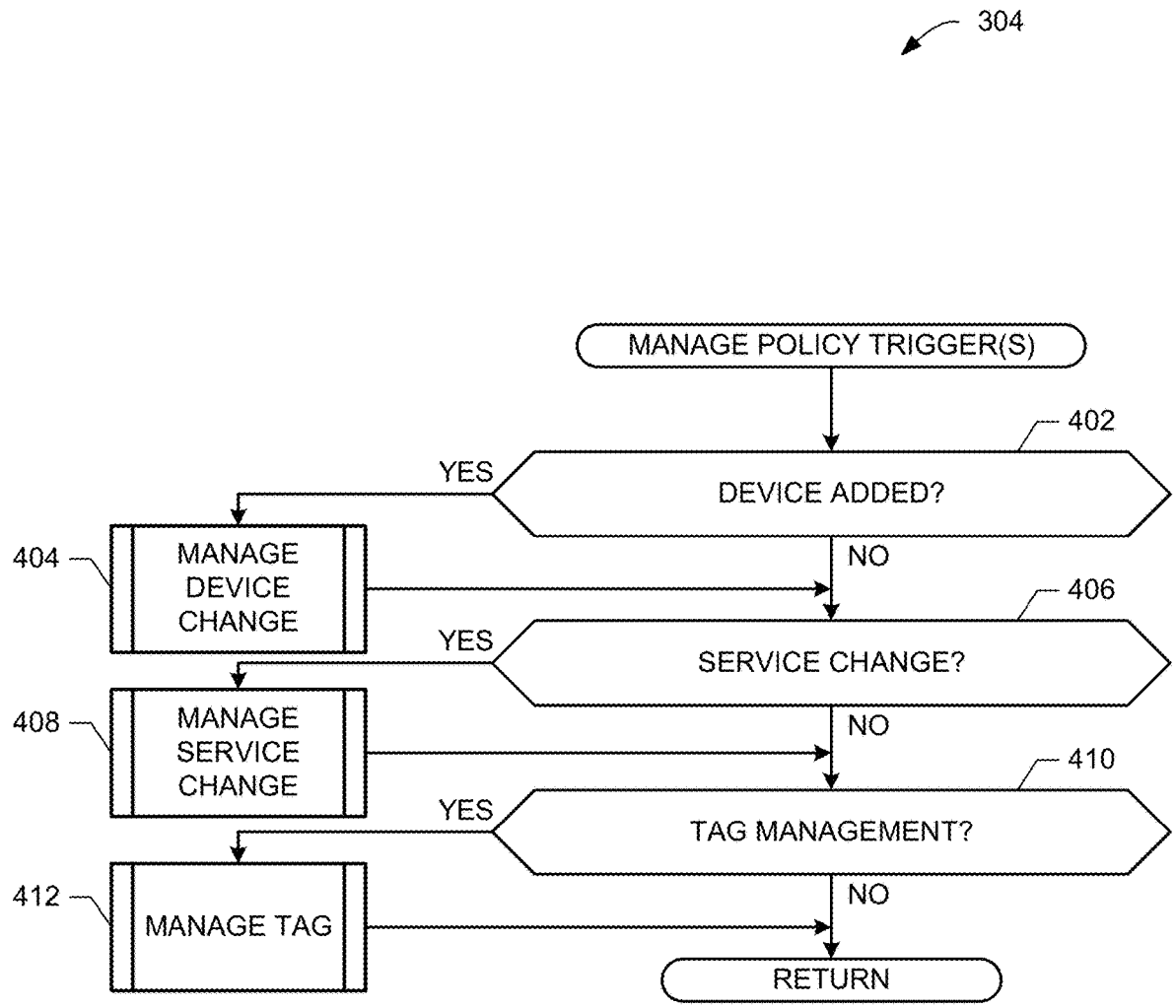

Additional detail associated with managing the policy trigger of block 304 is shown in FIG. 4. In the illustrated example of FIG. 4, the example edge node interface 112 determines whether a new IoT device has been added (block 402). If so, the example smart building gateway 102 manages the device change (block 404), as described in further detail below. Additionally, if the example edge node interface 112 does not identify any device change activity (block 402), then the example local policy resolution manager 104 determines whether a service change has occurred (block 406). As described above, any number of third party services providers (e.g., power utility company) may seek participants for one or more IoT devices in an effort to, for example, reduce infrastructure demand (e.g., power reduction during peak-power times of day), provide monitoring services (e.g., alarm system companies) and/or provide general home automation capabilities. Households, companies, buildings and/or any other interested parties that desire to use such services may allow the service provider to store operational logic within the example smart building manager 110 of the example smart building gateway 102. For example, the service provider may, when given permission, upload executable logic to the example smart building manager 110 to retrieve IoT device output data, process that data to determine one or more actions, and send control signals to one or more corresponding IoT devices to complete the service objective(s). In some examples, the service provider retrieves and/or otherwise receives IoT device output data via a network connection (e.g., the network 136 (e.g., the Internet)) for post-processing to determine trending information associated with the household. Based on results from the example post-processing, the service provider may publish one or more incentives for the household, such as incentives to save additional energy through automated control of the household IoT devices. In the event the example smart building manager 110 detects that a service change and/or a new service is available (block 406), then the example smart building manager 110 manages such events (block 408), as described in further detail below.

If the example smart building manager 110 does not identify a service change (block 406), then the example tag manager 106 determines whether a tag management event has occurred (block 410). If so, then the example tag manager 106 allows one or more example tag parameters 202 to be edited, added and/or otherwise updated (block 412), as described in further detail below.

Figure 5:
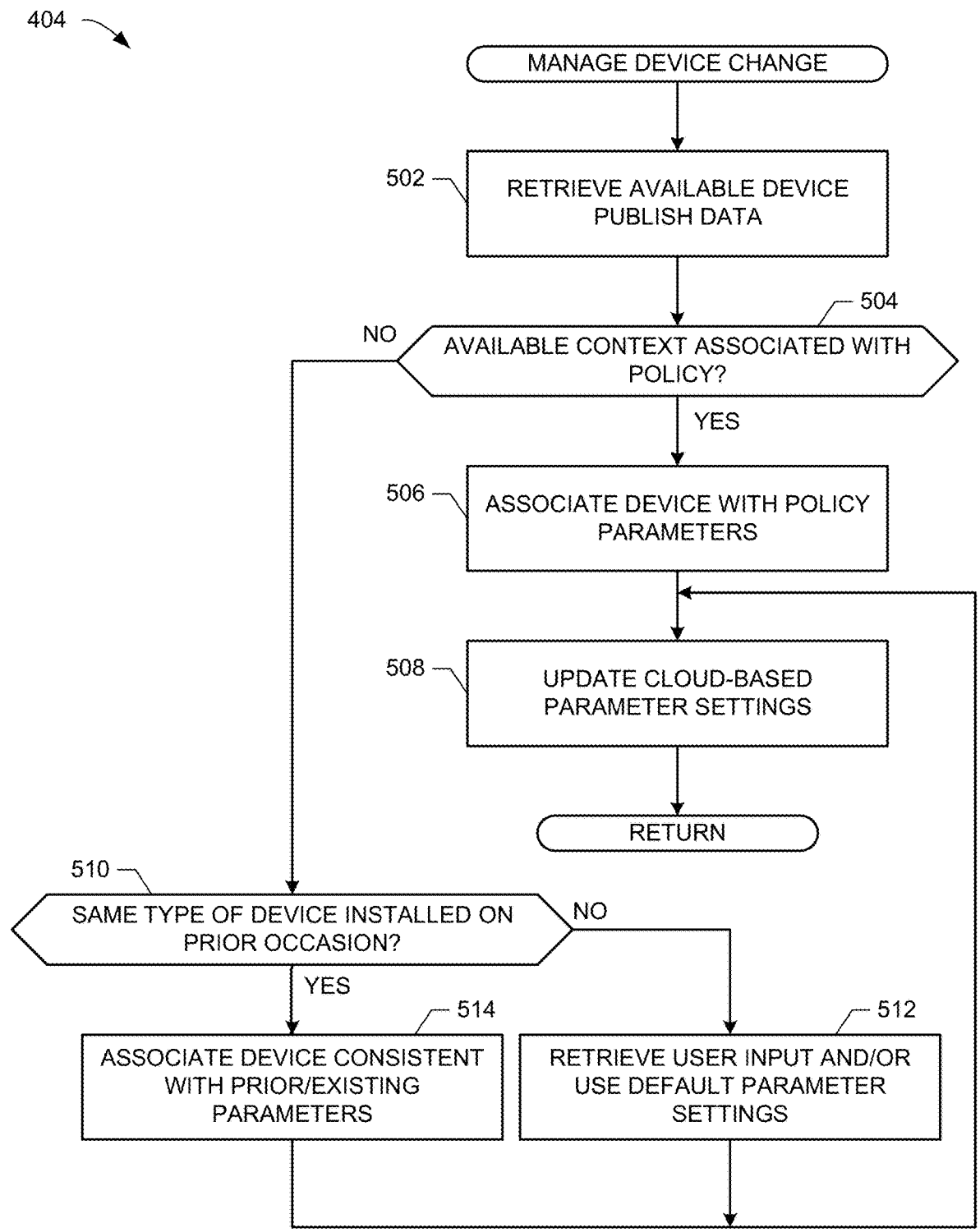

Additional detail associated with managing a trigger associated with a device change (block 404) is shown in FIG. 5. In the illustrated example of FIG. 5, the example edge node interface 112 receives available device publish data from an IoT device (block 502). In some examples, IoT devices communicate with the example smart building gateway 102 via the example edge node interface 112 via a wired connection, and in other examples the IoT device(s) utilize a Z-Wave wireless communication protocol. While the Z-Wave wireless communication protocol is described above, examples disclosed herein are not limited thereto. For example, the IoT devices may employ any communication protocol including, but not limited to an X10 protocol, a universal powerline bus (UPB) communication protocol, an Insteon® communication protocol, a Zigbee® communication protocol, a WiFi protocol and/or a Bluetooth Low Energy (BLE) communication protocol.

In the illustrated example of FIG. 5, the edge node interface 112 extracts publish information from a connected IoT device (block 502). In some examples, the publish information includes a model number, a serial number, a manufacturer name, an output unit, etc. The example device context manager 108 determines whether the publish information is associated with a user defined group (e.g., a user profile) (block 504), such as a group associated with spatial characteristics/context (e.g., IoT devices in furnace rooms, IoT devices in living rooms, IoT devices on windows), or associated with security characteristics/context (e.g., motion sensors, window sensors, break-glass sensors, etc.) and/or associated with energy characteristics (e.g., wattage meters, voltage meters, etc.). Generally speaking, households may include a relatively large number of IoT devices, thereby making individualized tagging efforts more time consuming. However, contextual information associated with the newly installed IoT devices, when analyzed by the example device context manager 108, reduces an amount of time required to classify the IoT device with corresponding tag parameters 202 associated with a particular user profile.

For example, a newly installed IoT device may include contextual information of 'output type=motion,' 'output value=0/1,' and 'manufacturer=ADT.' As such, a user defined group related to home security may also include motion sensors and/or manufacturer names matching 'ADT,' which are identified by the example device context manager 108 as a candidate match with a user profile (e.g., a profile associated with security) (block 504). The example tag manager 106 populates values for relevant tag parameters 202 associated with the newly added IoT device (block 506), thereby reducing an amount of time and/or effort on behalf of the household member when classifying the IoT device. For example, the tag manager 106 may assign a tag service access permission 226 parameter to "ADT Security" to allow publication of IoT device output to the security company, assign the tag device objective 222 parameter to "Home Security," assign the tag device type 218 parameter to "Magnet Sensor," and assign the tag assignment type 216 parameter to "Context Security."

In effect, such automated tagging of the newly added IoT device allows that device to immediately begin working toward its objective of monitoring home security activities with reduced input by the household user. In some examples, the user profile includes a publication policy that requires all newly added IoT devices with a particular publication status. For instance, relatively conservative users may establish a restrictive publication policy such that the publication status is initially set as "Local," while other users may establish a less restrictive publication policy such that the publication status is initially set as "Global." In the event the user defined group also establishes a default tag network authorization 214 parameter to a setting that permits remote monitoring by the user (e.g., "HAN/Remote"), then the example policy resolution manager 104 invokes the example local broker interface 132 to update the cloud server 134 with corresponding tag parameters 202 associated with the newly installed IoT device (block 508).

If the example device context manager 108 does not identify a corresponding user defined group (e.g., user profile) (block 504), then the device context manager 108 determines if the same type of device has been installed on one or more prior occasions (block 510). If not, then the example tag manager 106 prompts the user for tag parameter 202 input and/or uses default parameter values for the newly installed IoT device (block 512). However, in the event the example device context manager 108 determines that the same type of device has been installed on one or more prior occasions (block 510), then the example tag manager 106 associates one or more tag parameters 202 with values matching the other previously installed IoT device (block 514). In some examples, the device context manager 108 compares a type of the newly added IoT device to the type associated with one or more previously installed IoT devices to identify a match. In other examples, the device context manager 108 compares an output unit (e.g., voltage in volts, power in watts, etc.) to the output unit associated with one or more previously installed IoT devices. Such matches permit tag parameter value population when a profile is unavailable, and reduces tedious user tagging efforts. As described above, setting the tag parameters associated with the IoT device prohibits unauthorized disclosure of any data generated by the IoT device that may be deemed private/personal. With the aid of the user profile and context information associated with the IoT device, tag parameter values can be set with reduced user input, improved security, and prevent occupancy data from being published in a manner that is unwelcome to the user.

Figure 6:
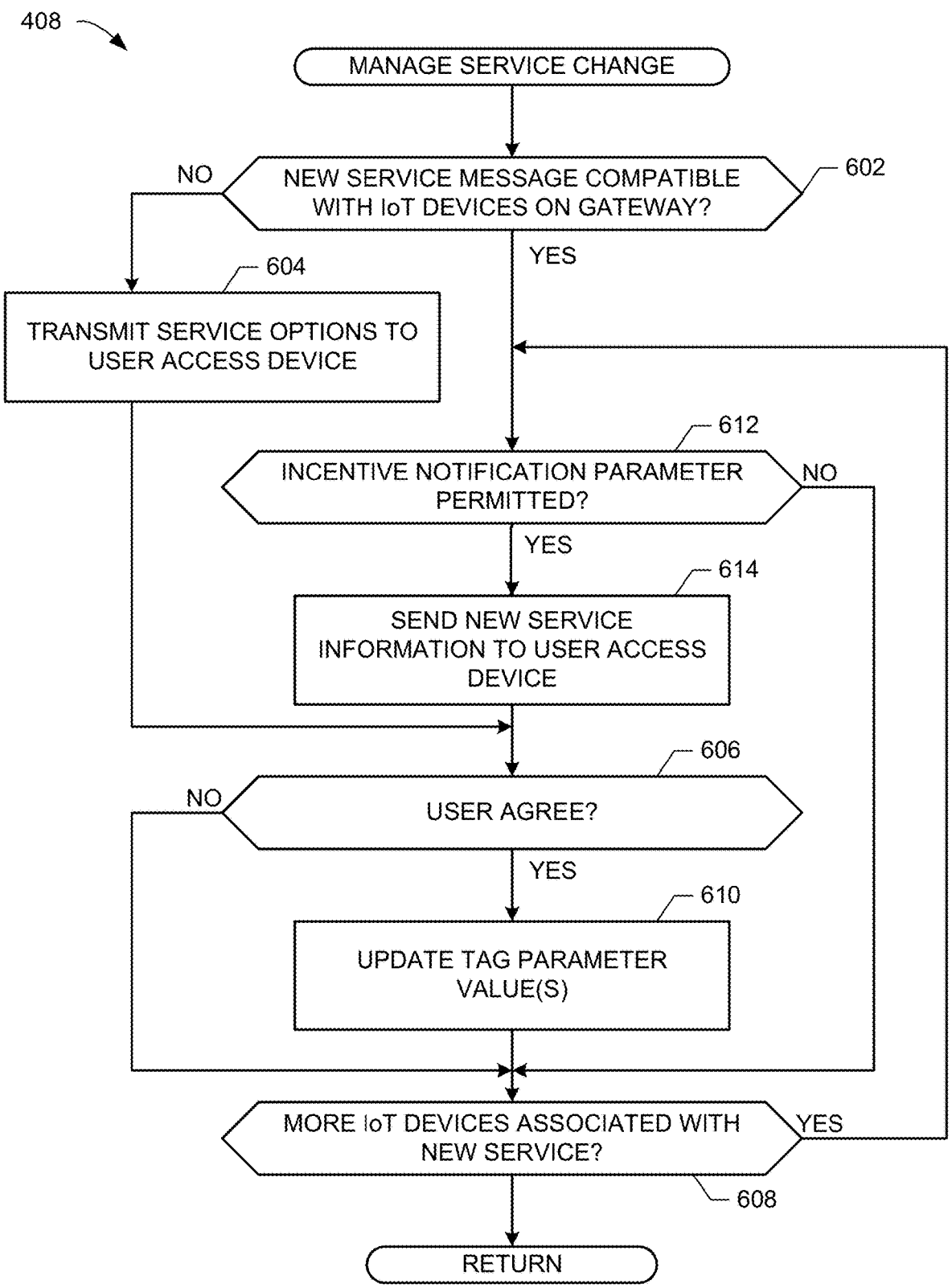

Additional detail associated with managing a service change (block 408) is shown in FIG. 6. In the illustrated example of FIG. 6, the example local policy resolution manager 104 determines whether a new service message from a service provider has been received (block 602). In some examples, the smart building manager 110 filters the incoming service message to initially determine whether the household has any IoT devices that are compatible with the service provider's offering/incentive. If none of the existing IoT devices are compatible with the offering/incentive (block 602), then the example local policy resolution manager 104 presents the offering/incentive to the user access device 124 for consideration in the event the user should eventually purchase and/or otherwise obtain a compatible IoT device (block 604). In some examples, the service provider may offer discounted rates for the IoT device, or offer the IoT device free of charge in exchange for agreeing to share any data collected by that IoT device. However, prior to inundating the user with the offering/incentive, the example tag manager 106 determines whether such offering/incentive messages are welcome by referencing the example tag incentive notification 224 parameter (block 606). If not, the smart building manager 110 determines whether one or more other sensors may be compatible and/or offered to the household (block 608). On the other hand, if the user agrees to the offering/incentive (block 606) based on the example tag incentive notification 224 parameter or via a message transmitted to the user access device 124, then the example tag manager 106 updates the tag parameters 202 to be associated with a corresponding IoT device to participate with the offering/incentive (block 610).

Returning to block 602, in the event the household includes one or more IoT devices associated with one or more proposed services, then the example tag manager 106 checks the example tag incentive notification 224 parameter to determine whether such solicitation is welcome and/or otherwise permitted (block 612). If not, control advances to block 608, otherwise the example local user access device interface 122 sends the information related to the offering/incentive to the example user access device 124 (block 614). Control advances to block 606 to determine whether the user agrees to participate with the offering/incentive.

Figure 7:
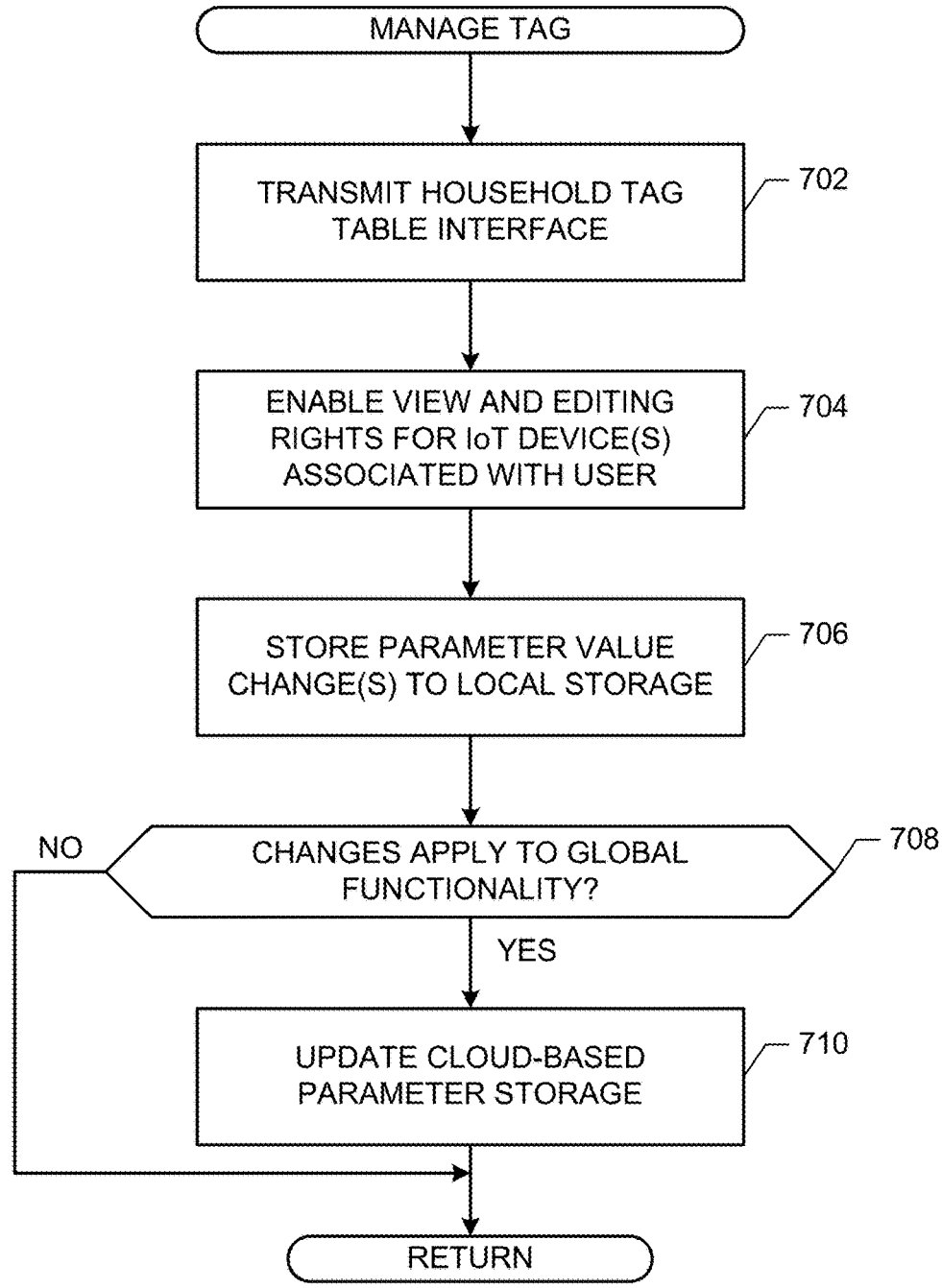

Additional detail associated with managing one or more tags (block 412) is shown in FIG. 7. In the illustrated example of FIG. 7, the example tag manager 106 transmits one or more portions of the example household tag table 200 to the user access device 124 (block 702). As described above, in response to a request to view and/or edit tag parameters 202, the example local user access device interface 122 may employ a web server or other user interface to facilitate viewing and/or editing of the example household tag table 200. The example local policy resolution manager 104 enables viewing and/or editing of only those tag parameters 202 associated with their authorization credentials (block 704). As described above, a single household may be an apartment with two or more residents, each of which may have their own number of IoT devices under their control. As such, examples disclosed herein permit each household member to individually manage and/or otherwise control what information those IoT devices may share. Any changes made by the user are stored by the local policy resolution manager in the local storage 126 (block 706). Additionally, in the event the example local policy resolution manager 104 determines that the example tag parameters 202 are modified to allow third party access (e.g., via the tag publish policy 212 parameter) and/or remote query/control access (e.g., via the tag network authorization 214 parameter) (block 708), then the example local policy resolution manager 104 updates the cloud-based parameter storage in the cloud storage 144 of the cloud server 134 (block 710).

Figure 8A:
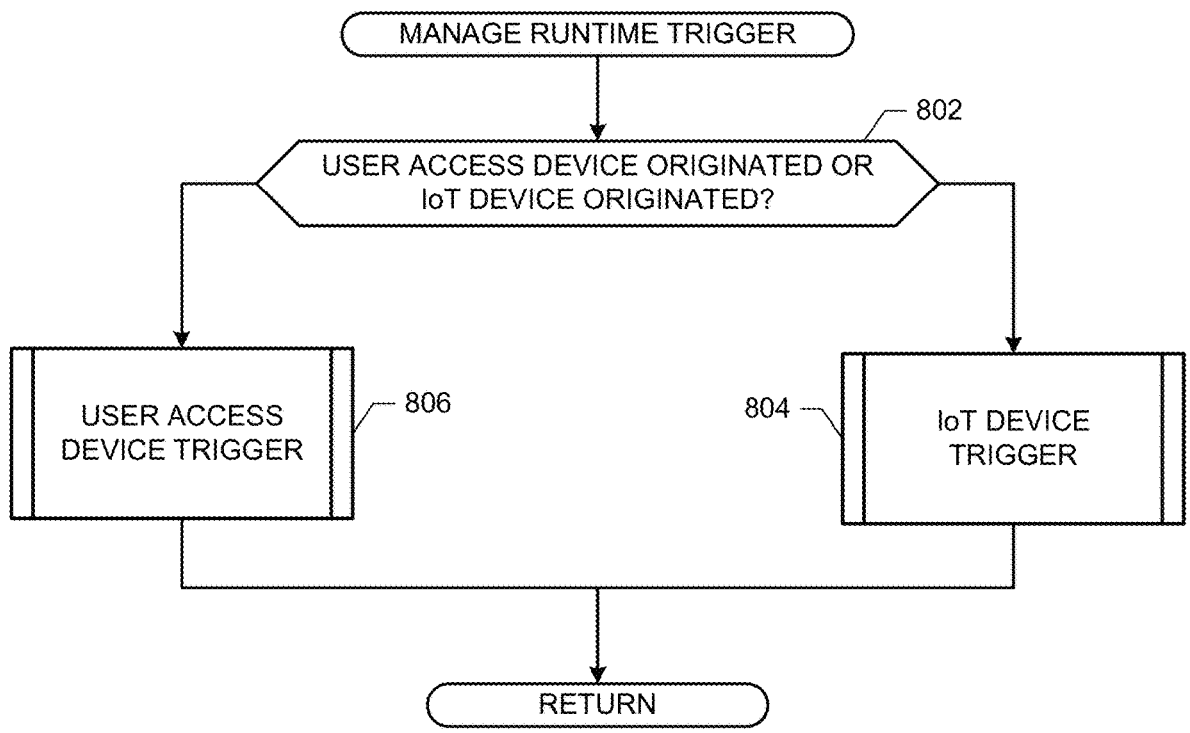

Additional detail associated with managing runtime trigger(s) (block 308) is shown in FIG. 8A. In the illustrated example of FIG. 8A, the example system 100 determines whether a runtime trigger occurs from one or more of (1) an IoT device, (2) a user access device 124 within the HAN 120, or (3) a user access device 124 outside the HAN 120 (block 802). If the example edge node interface 112 detects a trigger from an IoT device, such as one or more of the example first sensor 114, the example second sensor 116, etc. (block 802), then the example smart building gateway 102 manages the IoT device trigger (block 804), as described in further detail below in connection with FIG. 8B. If the example local user access device interface 122 or the example cloud user access device interface 142 detects a trigger from a user access device 124 (block 802), then a respective one of the example smart building gateway 102 or the example cloud server 134 manages the user device trigger (block 806), as described in further detail below in connection with FIG. 8C. As described above, the example network identifier 170, which could be a user installed application on a mobile phone, may force communication to occur only via WiFi when the example HAN 120 is detected.

Figure 8B:
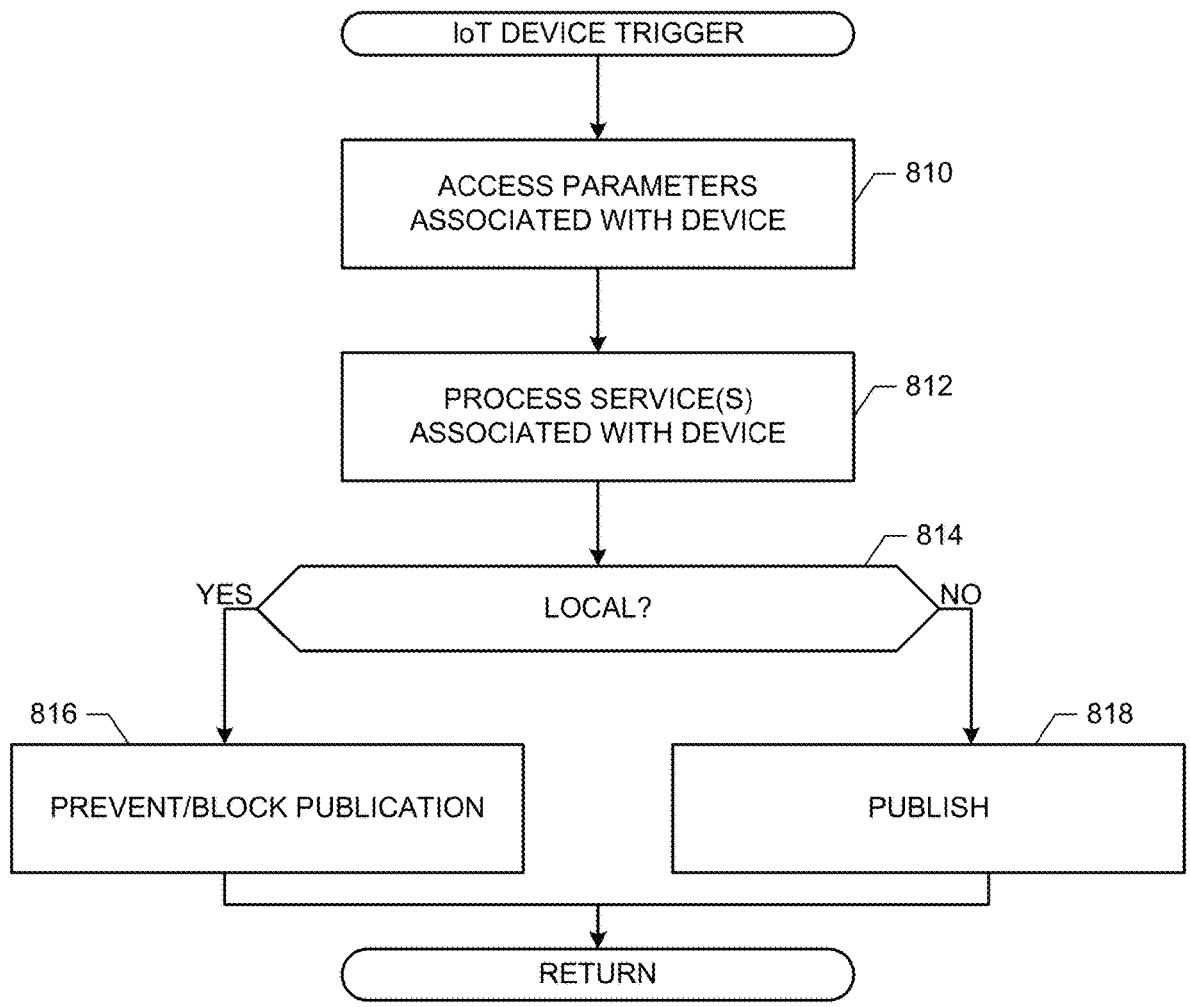
Figure 9:
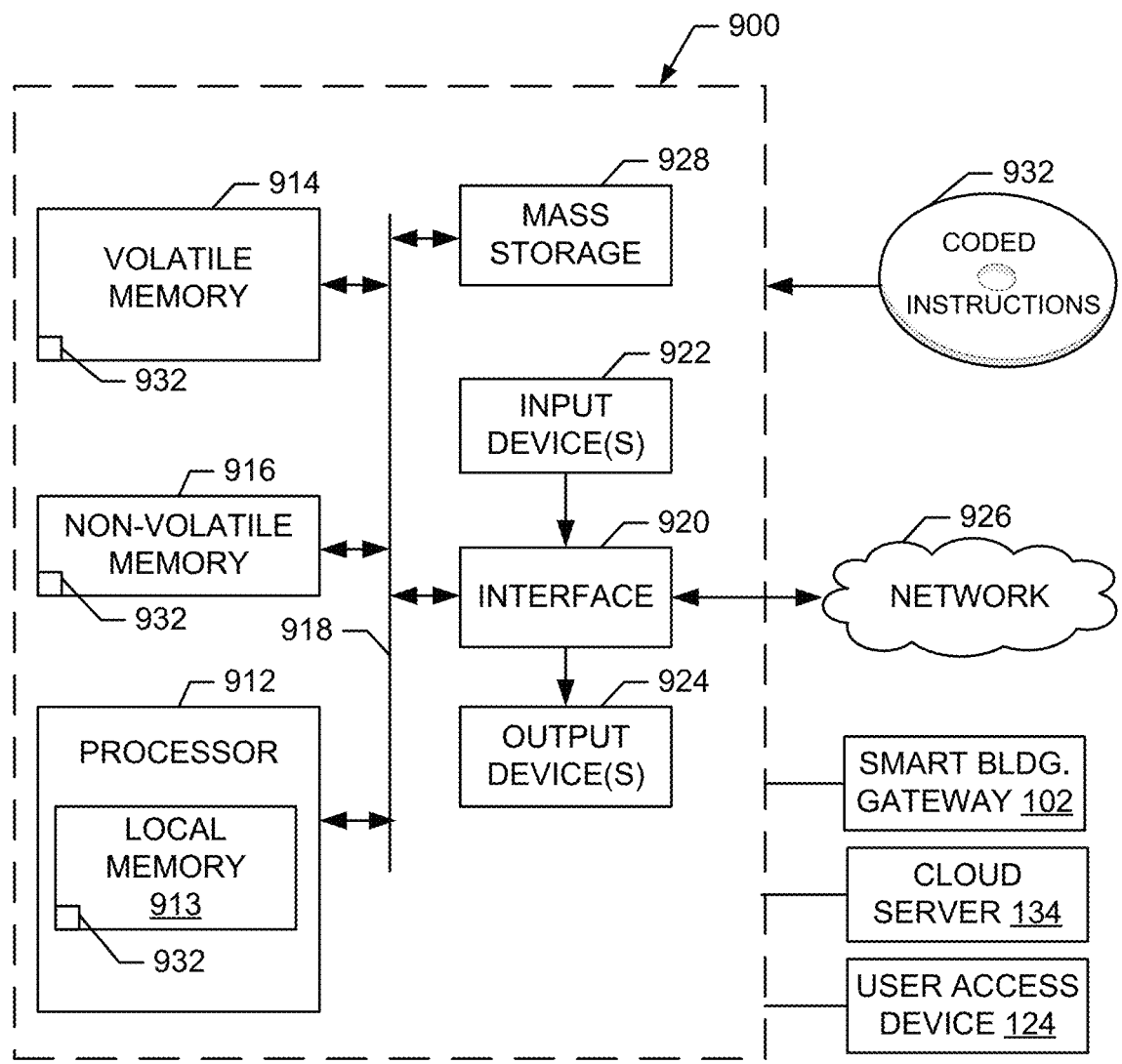
FIG. 9 is a schematic illustration of an example processor platform that may execute the instructions of FIGS. 3-7, 8A, 8B and 8C to implement the example policy management system of FIG. 1 and the example tag table of FIG. 2.

Turning to FIG. 8B, in response to the example edge node interface 112 detecting one or more output signals/values from an IoT device, the example local policy resolution manager 104 accesses tag parameters 202 associated with the IoT device (e.g., Device 1 from FIG. 2) (block 810). The example smart building manager 110 processes any associated services associated with the IoT device output (block 812). As described above, different IoT devices may be associated with any number of objectives/tasks including, but not limited to security monitoring, temperature control and/or energy saving initiatives. The example tag manager 106 determines a publication policy associated with the IoT device that prompted the runtime trigger by referencing the example tag publish policy 212 parameter from the example household tag table 200 stored in the example local storage 126 (block 814). In the event the IoT device has a "Local" publication policy setting, then the example local policy resolution manager 104 prevents and/or otherwise blocks publication of the IoT device output data to any third party (block 816). However, in some circumstances the publication policy may include a limited number of exceptions of particular third parties that are authorized to receive the data associated with the IoT device, which is determined by referencing the example tag service access permission 226 parameter of the example household tag table 200. In the event the example tag manager 106 identifies a "Global" publication policy (block 814), then the example local policy resolution manager 104 publishes the IoT device output data and/or otherwise makes such data available to third parties (block 818). However, and as described above, the example "Global" publication policy may be further limited to one or more specific third parties by way of reference to the example tag service access permission 226.

Figure 8C:
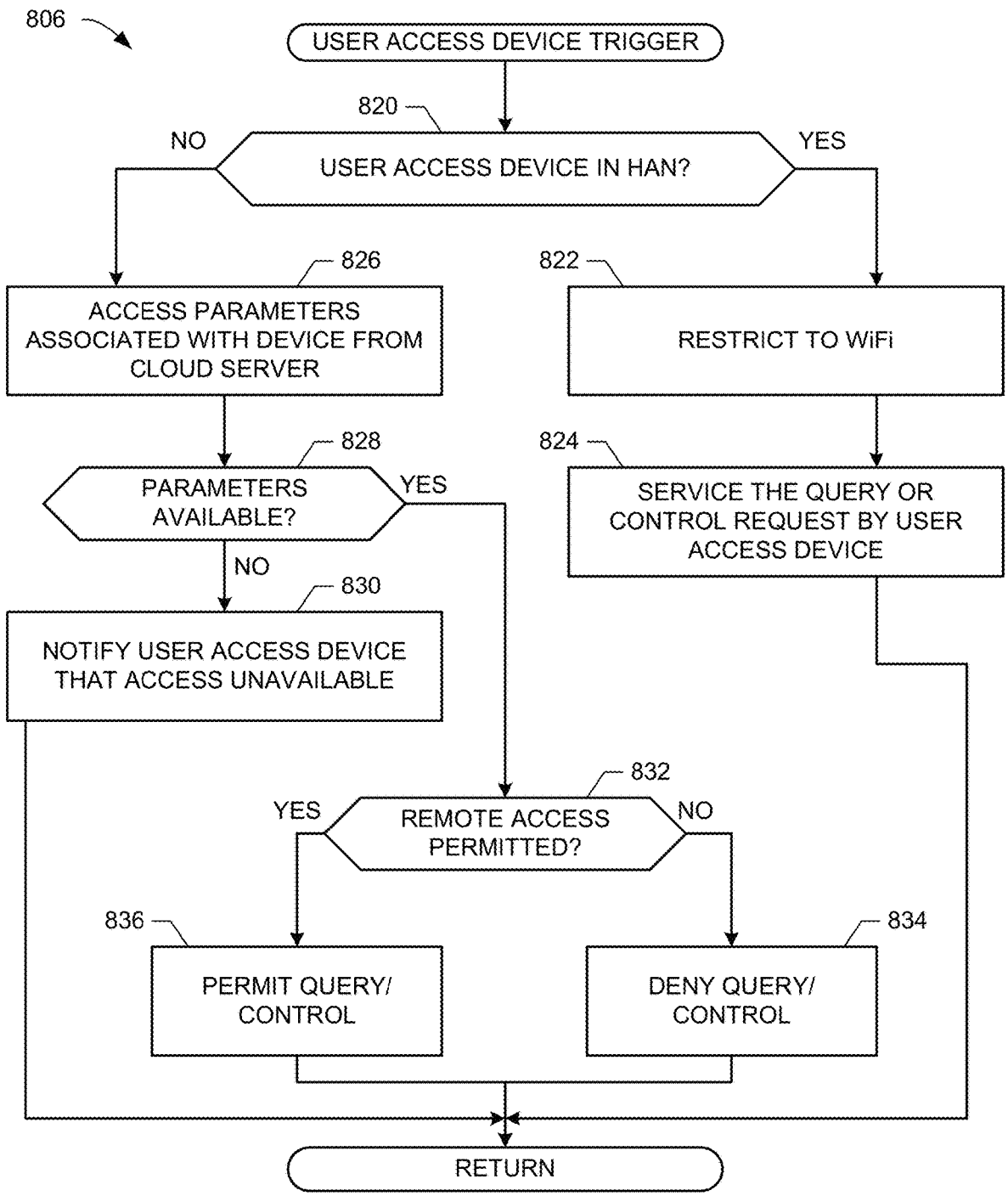

Additional detail associated with managing user access device trigger(s) (block 806) is shown in FIG. 8C. In the illustrated example of FIG. 8C, the example local user access device interface 122 retrieves and/or otherwise receives a request from a user access device 124 (block 820). Alternatively, in the event the user access device 124 is located remotely to the example HAN 120, the example cloud user access device interface 142 retrieves and/or otherwise receives a request from the user access device 124 (block 820). In some examples, the network identifier 170 of the user access device 124 transmits an indication of connectivity to the HAN 120 so that only the example WiFi radio 172 is used when making queries and/or control commands to the IoT device (block 822). In some examples, the local user access device interface 122 detects the presence of the user access device 124 and/or the WiFi radio 172 associated with the user access device 124 and, if present within the HAN 120, the example network identifier 170 restricts all query and/or control commands to use the WiFi radio 172 instead of any cell-based radio of the example user access device 124 (block 822). The example local policy resolution manager 104 then services the query and/or control of the IoT device (block 824).

In the event the cloud user access device interface 142 retrieves and/or otherwise receives the request from the user access device 124 (block 820), then the user access device 124 is deemed to be outside the HAN 120 and, therefore, subject to a greater degree of scrutiny when making a query or control command to the IoT device. To determine whether the requested query and/or control command is authorized, the example cloud policy resolution manager 140 queries the example cloud tag data storage 146 in the example cloud storage 144 (block 826). If no associated tag parameters 202 are available in the example cloud storage 144 (block 828), then the example cloud user access device interface 142 generates and transmits a notification message to the user access device 124 that access is unauthorized or unavailable (block 830). As described above, in the event an IoT device is restricted from remote access and/or publication to one or more third parties, the example local policy resolution manager 104 prevents storage of tag parameters 202 in the example cloud server 134.

If the cloud policy resolution manager 140 determines that tag parameters 202 are available for the requested IoT device (block 828), then the example cloud policy resolution manager 140 evaluates the example tag network authorization 214 parameter to determine if the IoT device is to be queried and/or controlled when accessed remotely (block 832). For example, if the tag network authorization 214 parameter indicates access is only to be permitted within the HAN 120 (e.g., the tag network authorization 214 parameter is set to "HAN Only"), then the cloud broker interface 138 prohibits and/or otherwise denies query and control command capabilities of the requesting user access device 124 (block 834). However, if the tag network authorization 214 parameter indicates access to the IoT device is permitted outside the HAN 120 (e.g., the tag network authorization 214 parameter is set to "HAN/Remote"), then the cloud broker interface 138 propagates the query and/or control commands to the example smart building gateway 102 for processing (block 836).

FIG. 9 is a block diagram of an example processor platform 900 capable of executing the instructions of FIGS. 3-7, 8A, 8B and 8C to implement the system of FIGS. 1 and 2. The processor platform 900 can be, for example, a server, a personal computer, a mobile device (e.g., a cell phone, a smart phone, a tablet such as an iPad™), an Internet appliance, a gaming console, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. Additionally, the processor platform 900 may include one or more elements of the example system of FIGS. 1 and/or 2, and/or the one or more elements of the example system of FIGS. 1 and/or 2 may utilize resources of the example processor platform 900. The example processor 912 may implement the example smart building gateway 102, the example cloud server 134, the example user access device 124 and/or any number of elements thereof. In some examples, one or more separate processor platforms 900 may be implemented for one or more different aspects of the example system 100 of FIGS. 1 and/or 2. In some examples, one or more processor platforms 900 may be implemented or dedicated to the example smart building gateway 102, one or more processor platforms 900 may be implemented or dedicated to the example cloud server 134, and/or one or more processor platforms 900 may be implemented or dedicated to the example user access device 124. In such examples, the processor 912 within respective platform(s) 900 facilitates one or more operations. In some examples, one or more of the smart building gateway 102, the example cloud server 134 and/or the example smart building gateway 102 are integrated, are instantiations of, and/or otherwise facilitated with one or more processor platforms, such as the example processor platform 900 of FIG. 9.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 3-7, 8A, 8B and 8C may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture encourage market participation in IoT devices by providing user control over data disclosure rights that would otherwise give users concern for data privacy. Data generated by the IoT devices is protected by examples disclosed herein from unauthorized distribution and/or disclosure to third parties. Additionally, examples disclosed herein reduce data conflicts for IoT devices used in single dwellings having multiple residents via the example tag parameters associated with IoT devices owned and/or otherwise controlled by individual members of that dwelling.

Example 1 is an apparatus to manage networked user devices that includes an edge node interface to: detect addition of a networked user device to a service gateway; and extract publish information from the networked user device; a device context manager to identify tag parameters based on the publish information from the networked user device; and a tag manager to prohibit unauthorized disclosure of the networked user device by setting values of the tag parameters based on a user profile associated with a type of the networked user device.

Example 2 includes the subject matter of example 1, further including the device context manager to compare the type of the networked user device to previously installed network user devices on the service gateway.

Example 3 includes the subject matter of example 2, wherein the tag manager is to set tag parameter values to the networked device based on tag parameter values of one of the previously installed network user devices when the comparison results in a match.

Example 4 includes the subject matter of example 1, further including a local policy resolution manager to identify a publication policy associated with the user profile.

Example 5 includes the subject matter of example 4, further including a broker interface to publish the tag parameters associated with the networked user device to a remote cloud server when the publication policy authorizes consumption of data from the networked user device by a third party.

Example 6 includes the subject matter of example 5, wherein the third party includes at least one of a utility service provider or a security service provider.

Example 7 includes the subject matter of example 4, further including a broker interface to block publication of the tag parameters associated with the networked user device to a remote cloud server when the publication policy prohibits consumption of data from the networked user device by a third party.

Example 8 includes the subject matter of at least one of examples 5 or 7, wherein the policy resolution manager is to authorize tag parameter modification based on the user profile associated with the type of the networked user device.

Example 9 includes the subject matter of example 1, wherein the tag manager is to set a network authorization tag to permit publication from the networked user device to a user access device when the user access device is connected to a home network shared by the service gateway.

Example 10 includes the subject matter of example 1, wherein the tag manager is to set a network authorization tag to prohibit publication from the networked user device to a user access device when the user access device is connected to a network different than a home network of the service gateway.

Example 11 includes the subject matter of any one of examples 9 or 10, further including a local user device access interface to provide a web server interface to the user access device to communicate publication data from the networked user device.

Example 12 includes the subject matter of example 1, wherein the networked user device includes a sensor.

Example 13 includes the subject matter of example 12, wherein the sensor includes at least one of a temperature sensor, a power sensor, a voltage sensor, a current sensor, a light sensor, a magnetic sensor, or a motion sensor.

Example 14 includes the subject matter of example 1, wherein the networked user device includes at least one of a relay or a switch.

Example 15 includes the subject matter of example 1, further including a network identifier to restrict at least one of a query or control attempt by a cell-based network communication system when a WiFi network is available.

Example 16 includes a method to manage networked devices, including detecting addition of a networked user device to a service gateway; extracting publish information from the networked user device; identifying tag parameters based on the publish information from the networked user device; and prohibiting unauthorized disclosure of the networked user device by setting values of the tag parameters based on a user profile associated with a type of the networked user device.

Example 17 includes the subject matter of example 16, further including comparing the type of the networked user device to previously installed network user devices on the service gateway.

Example 18 includes the subject matter of example 17, further including setting tag parameter values to the networked device based on tag parameter values of one of the previously installed network user devices when the comparison results in a match.

Example 19 includes the subject matter of example 16, further including identifying a publication policy associated with the user profile.

Example 20 includes the subject matter of example 19, further including publishing the tag parameters associated with the networked user device to a remote cloud server when the publication policy authorizes consumption of data from the networked user device by a third party.

Example 21 includes the subject matter of example 20, wherein the third party includes at least one of a utility service provider or a security service provider.

Example 22 includes the subject matter of example 19, further including blocking publication of the tag parameters associated with the networked user device to a remote cloud server when the publication policy prohibits consumption of data from the networked user device by a third party.

Example 23 includes the subject matter of examples 20-22, further including authorizing tag parameter modification based on the user profile associated with the type of the networked user device.

Example 24 includes the subject matter of example 16, further including setting a network authorization tag to permit publication from the networked user device to a user access device when the user access device is connected to a home network shared by the service gateway.

Example 25 includes the subject matter of example 16, further including setting a network authorization tag to prohibit publication from the networked user device to a user access device when the user access device is connected to a network different than a home network of the service gateway.

Example 26 includes the subject matter of examples 24 or 25, further including providing a web server interface to communicate publication data from the networked user device.

Example 27 includes the subject matter of example 16, wherein the networked user device includes a sensor.

Example 28 includes the subject matter of example 27, wherein the sensor includes at least one of a temperature sensor, a power sensor, a voltage sensor, a current sensor, a light sensor, a magnetic sensor, or a motion sensor.

Example 29 includes the subject matter of example 16, wherein the networked user device includes at least one of a relay or a switch.

Example 30 includes the subject matter of example 16, further including restricting at least one of a query or control attempt by a cell-based network communication system when a WiFi network is available.

Example 31 includes a tangible computer readable storage medium including computer readable instructions which, when executed, cause a processor to at least detect addition of a networked user device to a service gateway; extract publish information from the networked user device; identify tag parameters based on the publish information from the networked user device; and prohibit unauthorized disclosure of the networked user device by setting values of the tag parameters based on a user profile associated with a type of the networked user device.

Example 32 includes the subject matter of example 31, wherein the instructions, when executed, cause the processor to compare the type of the networked user device to previously installed network user devices on the service gateway.

Example 33 includes the subject matter of example 32, wherein the instructions, when executed, cause the processor to set tag parameter values to the networked device based on tag parameter values of one of the previously installed network user devices when the comparison results in a match.

Example 34 includes the subject matter of example 31, wherein the instructions, when executed, cause the processor to identify a publication policy associated with the user profile.

Example 35 includes the subject matter of example 34, wherein the instructions, when executed, cause the processor to publish the tag parameters associated with the networked user device to a remote cloud server when the publication policy authorizes consumption of data from the networked user device by a third party.

Example 36 includes the subject matter of example 34, wherein the instructions, when executed, cause the processor to block publication of the tag parameters associated with the networked user device to a remote cloud server when the publication policy prohibits consumption of data from the networked user device by a third party.

Example 37 includes the subject matter of example 31, wherein the instructions, when executed, cause the processor to set a network authorization tag to permit publication from the networked user device to a user access device when the user access device is connected to a home network shared by the service gateway.

Example 38 includes the subject matter of example 31, wherein the instructions, when executed, cause the processor to set a network authorization tag to prohibit publication from the networked user device to a user access device when the user access device is connected to a network different than a home network of the service gateway.

Example 39 includes the subject matter of example 31, wherein the instructions, when executed, cause the processor to restrict at least one of a query or control attempt by a cell-based network communication system when a WiFi network is available.

Example 40 includes a system to manage networked user devices, including means for detecting addition of a networked user device to a service gateway; means for extracting publish information from the networked user device; means for identifying tag parameters based on the publish information from the networked user device; and means for prohibiting unauthorized disclosure of the networked user device by setting values of the tag parameters based on a user profile associated with a type of the networked user device.

Example 41 includes the subject matter of example 40, further including means for comparing the type of the networked user device to previously installed network user devices on the service gateway.

Example 42 includes the subject matter of example 41, further including means for setting tag parameter values to the networked device based on tag parameter values of one of the previously installed network user devices when the comparison results in a match.

Example 43 includes the subject matter of example 40, further including means for identifying a publication policy associated with the user profile.

Example 44 includes the subject matter of example 43, further including means for publishing the tag parameters associated with the networked user device to a remote cloud server when the publication policy authorizes consumption of data from the networked user device by a third party.

Example 45 includes the subject matter of example 43, further including means for blocking publication of the tag parameters associated with the networked user device to a remote cloud server when the publication policy prohibits consumption of data from the networked user device by a third party.

Example 46 includes the subject matter of examples 44 or 45, further including means for authorizing tag parameter modification based on the user profile associated with the type of the networked user device.

Example 47 includes the subject matter of example 40, further including means for setting a network authorization tag to permit publication from the networked user device to a user access device when the user access device is connected to a home network shared by the service gateway.

Example 48 includes the subject matter of example 40, further including means for setting a network authorization tag to prohibit publication from the networked user device to a user access device when the user access device is connected to a network different than a home network of the service gateway.

Example 49 includes the subject matter of examples 47 or 48, further including means for providing a web server interface to the user access device to communicate publication data from the networked user device.

Example 50 includes the subject matter of example 40, further including means for restricting at least one of a query or control attempt by a cell-based network communication system when a WiFi network is available.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable medium comprising machine readable instructions which, when executed, cause processor circuitry to:
    based on addition of a first device to a network, retrieve a model number of the first device, the model number corresponding to a type of the first device;
    determine whether a data structure has previously been populated for a second device corresponding to the type of the first device;
    based on determining that the data structure has previously been populated for the second device, control the first device based on first tag parameters of the data structure;
    based on determining that the data structure has not previously been populated for the second device, cause access to a database based on the model number of the first device to determine second tag parameters associated with devices of the type, the second tag parameters associated with control of devices of the type;
    populate the data structure for the first device with the second tag parameters associated with devices of the type; and
    cause control of the first device based on the second tag parameters associated with devices of the type.

2. The non-transitory computer readable medium of claim 1, wherein the type of the first device to be added to the network includes at least one of a sensor or an actuator.

3. The non-transitory computer readable medium of claim 1, wherein the machine readable instructions cause the processor circuitry to:
    cause display of a web-based user interface through which authorized users modify the second tag parameters associated with devices of the type; and
    based on a request to modify the second tag parameters of devices of the type from an authorized user, modify the second tag parameters associated with devices of the type.

4. The non-transitory computer readable medium of claim 1, wherein the machine readable instructions cause the processor circuitry to cause routing of (a) a first communication from a cloud server to the first device and (b) a second communication from the first device to the cloud server, the first communication indicating a change to a property controlled by the first device, the second communication indicating whether the first device caused the change.

5. The non-transitory computer readable medium of claim 1, wherein the machine readable instructions cause the processor circuitry to cause routing of (a) a first communication from an edge node to the first device and (b) a second communication from the first device to the edge node, the first communication indicating a change to a property controlled by the first device, the second communication indicating whether the first device caused the change.

6. The non-transitory computer readable medium of claim 1, wherein the network includes an Internet of Things network.

7. A non-transitory computer readable medium comprising machine readable instructions which, when executed, cause processor circuitry to:
    based on addition of a first device to a network, retrieve a model identifier of the first device, the model identifier corresponding to a device type;
    determine whether a data structure has previously been populated for a second device corresponding to the device type;
    based on determining that the data structure has previously been populated for the second device, control the first device based on first parameters of the data structure;
    based on determining that the data structure has not previously been populated for the second device, cause access to storage based on the model identifier of the first device, to determine second parameters associated with the device type, the second parameters associated with control of devices of the device type;
    populate the data structure for the first device with the second parameters associated with the device type; and
    cause control of the first device based on the second parameters associated with the device type.

8. The non-transitory computer readable medium of claim 7, wherein the device type of the first device to be added to the network includes at least one of a sensor or an actuator.

9. The non-transitory computer readable medium of claim 7, wherein the machine readable instructions cause the processor circuitry to:
    cause display of a web-based user interface through which authorized users modify the second parameters associated with the device type; and based on a request to modify the second parameters associated with the device type from an authorized user, modify the second parameters associated with the device type.

10. The non-transitory computer readable medium of claim 7, wherein the machine readable instructions cause the processor circuitry to cause routing of (a) a first communication from a cloud server to the first device and (b) a second communication from the first device to the cloud server, the first communication indicating a change to a property controlled by the first device, the second communication indicating whether the first device caused the change.

11. The non-transitory computer readable medium of claim 7, wherein the machine readable instructions cause the processor circuitry to cause routing of (a) a first communication from an edge node to the first device and (b) a second communication from the first device to the edge node, the first communication indicating a change to a property controlled by the first device, the second communication indicating whether the first device caused the change.

12. The non-transitory computer readable medium of claim 7, wherein the network includes an Internet of Things network.

13. An apparatus comprising:
   memory;
   instructions; and
   processor circuitry to execute the instructions to at least:
      retrieve a model identifier of a first device on a network, the model identifier corresponding to a device type;
      determine whether a data structure has previously been populated for a second device corresponding to the device type;
      based on determining that the data structure has previously been populated for the second device, control the first device based on first parameters of the data structure;
      based on determining that the data structure has not previously been populated for the second device, cause access to storage based on the device type to determine second parameters associated with the device type, the second parameters associated with control of devices of the device type;
      populate the data structure for the first device with the second parameters associated with the device type; and
      cause control of the first device based on the second parameters associated with the device type.

14. The apparatus of claim 13, wherein the device type of the first device to be added to the network includes at least one of a sensor or an actuator.

15. The apparatus of claim 13, wherein the processor circuitry is to:
   cause display of a web-based user interface through which authorized users modify the second parameters associated with the device type; and
   based on a request to modify the second parameters associated with the device type from an authorized user, modify the second parameters associated with the device type.

16. The apparatus of claim 13, wherein the processor circuitry is to cause routing of (a) a first communication from a cloud server to the first device and (b) a second communication from the first device to the cloud server, the first communication indicating a change to a property controlled by the first device, the second communication indicating whether the first device caused the change.

17. The apparatus of claim 13, wherein the processor circuitry is to cause routing of (a) a first communication from an edge node to the first device and (b) a second communication from the first device to the edge node, the first communication indicating a change to a property controlled by the first device, the second communication indicating whether the first device caused the change.

18. The apparatus of claim 13, wherein the network includes an Internet of Things network.

19. A method comprising:
   based on addition of a first device to a network, retrieving a model identifier of the first device, the model identifier corresponding to a type of the first device;
   determining, by executing an instruction with processor circuitry, whether a data structure has previously been populated for a second device corresponding to the type of the first device;
   based on determining that the data structure has previously been populated for the second device, controlling, by executing an instruction with the processor circuitry, the first device based on first parameters of the data structure;
   based on determining that the data structure has not previously been populated for the second device, accessing, by executing an instruction with the processor circuitry, a database based on the model identifier of the first device to determine second parameters associated with devices of the type, the second parameters associated with control of devices of the type;
   populating, by executing an instruction with the processor circuitry, the data structure for the first device with the second parameters associated with devices of the type; and
   controlling the first device based on the second parameters associated with devices of the type.

20. The method of claim 19, wherein the type of the first device to be added to the network includes at least one of a sensor or an actuator.

21. The method of claim 19, further including:
   displaying of a web-based user interface through which authorized users modify the second parameters associated with devices of the type; and
   based on a request to modify the second parameters of devices of the type from an authorized user, modifying the second parameters associated with devices of the type.

22. The method of claim 19, further including routing of (a) a first communication from a cloud server to the first device and (b) a second communication from the first device to the cloud server, the first communication indicating a change to a property controlled by the first device, the second communication indicating whether the first device caused the change.

* * * * *